US011121450B1

(12) United States Patent
Nguyen

(10) Patent No.: US 11,121,450 B1
(45) Date of Patent: Sep. 14, 2021

(54) ELECTRONIC APPARATUS

(71) Applicant: LENOVO (SINGAPORE) PTE. LTD., Singapore (SG)

(72) Inventor: Xuan Tung Nguyen, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 16/871,031

(22) Filed: May 10, 2020

(30) Foreign Application Priority Data

Feb. 28, 2020 (JP) .............................. JP2020-032628

(51) Int. Cl.
| | |
|---|---|
| *H01Q 19/10* | (2006.01) |
| *H01Q 1/22* | (2006.01) |
| *G06F 1/16* | (2006.01) |
| *H01Q 15/14* | (2006.01) |
| *H01Q 1/52* | (2006.01) |
| *H01Q 9/04* | (2006.01) |

(52) U.S. Cl.
CPC ......... *H01Q 1/2266* (2013.01); *G06F 1/1656* (2013.01); *H01Q 1/526* (2013.01); *H01Q 9/0407* (2013.01); *H01Q 15/14* (2013.01); *G06F 1/1616* (2013.01)

(58) Field of Classification Search
CPC ... G06F 1/1681; G06F 1/1616; H01Q 1/2266; H01Q 15/14; H01Q 9/0407; H01Q 1/526; H05K 5/0226
See application file for complete search history.

(56) References Cited

U.S. PATENT DOCUMENTS

| | | | | | |
|---|---|---|---|---|---|
| 10,135,147 | B2* | 11/2018 | Henry | ................... | H01Q 13/06 |
| 10,727,599 | B2* | 7/2020 | Wolniansky | ......... | H01Q 13/085 |
| 2009/0115673 | A1* | 5/2009 | Nysen | ...................... | H01Q 7/00 |
| | | | | | 343/730 |
| 2009/0122847 | A1* | 5/2009 | Nysen | .................. | H01Q 1/2275 |
| | | | | | 375/222 |
| 2011/0057851 | A1* | 3/2011 | Chung | ................. | H01Q 15/006 |
| | | | | | 343/793 |
| 2013/0321220 | A1* | 12/2013 | Toujo | .................... | H01Q 1/243 |
| | | | | | 343/702 |
| 2015/0303587 | A1* | 10/2015 | Pan | ..................... | H04B 7/0413 |
| | | | | | 342/372 |
| 2019/0036222 | A1* | 1/2019 | Henry | .................. | H01Q 21/064 |

FOREIGN PATENT DOCUMENTS

JP          2013162413 A      8/2013

\* cited by examiner

*Primary Examiner* — Thien M Le
(74) *Attorney, Agent, or Firm* — Shimokaji Ip

(57) ABSTRACT

An electronic apparatus includes: a chassis composed at least of an upper plate, a lower plate, and a side face; at least one plate-like antenna having a radio wave transmission/reception part which deals with radio waves in a millimeter wave band and forms one surface of the antenna; and a conductive reflection member having a main part with a reflection surface reflecting the radio waves in the millimeter wave band. The antenna is placed in an outer peripheral edge area including an outer peripheral edge of the upper plate in plan view in such a manner that the radio wave transmission/reception part faces the upper plate. The reflection member is so placed that the antenna is sandwiched between the reflection member and the side face in plan view. At least the side face transmits the radio waves. The reflection surface is directed toward the antenna.

7 Claims, 29 Drawing Sheets

ELECTRONIC APPARATUS

FIELD OF THE INVENTION

The present invention relates to an electronic apparatus.

BACKGROUND OF THE INVENTION

An electronic apparatus such as a laptop personal computer (laptop PC) has an antenna for wireless communication (for example, see Japanese Unexamined Patent Application Publication No. 2013-162413).

SUMMARY OF THE INVENTION

In the electronic apparatus, the transmission/reception characteristics of the antenna may be inadequate depending on the antenna specifications. When the placement of the antenna is adjusted to improve the transmission/reception characteristics, the chassis structure may be limited. This may cause the degree of freedom of designing the electronic apparatus to be lowered.

It is an object of the present invention to provide an electronic apparatus having good antenna transmission/reception characteristics and a high degree of freedom in design.

One aspect of the present invention provides an electronic apparatus including: a chassis composed of at least an upper plate, a lower plate, and a side face; at least one plate-like antenna provided inside the chassis and having a radio wave transmission/reception part which deals with radio waves in a millimeter wave band and forms one surface of the antenna; and a conductive reflection member provided inside the chassis and having a main part with a reflection surface reflecting the radio waves in the millimeter wave band, wherein the antenna is placed in an outer peripheral edge area including an outer peripheral edge of the upper plate in plan view in such a manner that the radio wave transmission/reception part faces the upper plate, the reflection member is so placed that the antenna is sandwiched between the reflection member and the side face in plan view, at least the side face transmits the radio waves, and the reflection surface is directed toward the antenna.

It is preferred that the reflection member be in contact with at least either one of the upper plate and the lower plate in a heat transferable manner.

The reflection member may also have a support part which supports the antenna.

It is preferred that at least a partial region of the upper plate be a radio wave transmission part which transmits the radio waves, and the radio wave transmission part should overlap at least part of the radio wave transmission/reception part in plan view.

It is preferred that at least a partial area of the upper plate be a radio wave transmission part which allows the radio waves to be transmitted therethrough, and the radio wave transmission part should overlap at least part of the radio wave transmission/reception part in plan view.

It is preferred that the reflection member be made of a metal.

The electronic apparatus may further include a keyboard provided on the chassis, a display chassis coupled openably and closably to the chassis through a hinge, and a display mounted on the display chassis.

The one aspect of the present invention can provide an electronic apparatus having good antenna transmission/reception characteristics and a high degree of freedom in design.

DETAILED DESCRIPTION OF THE INVENTION

[Electronic Apparatus] (First Embodiment)

Figure 1:
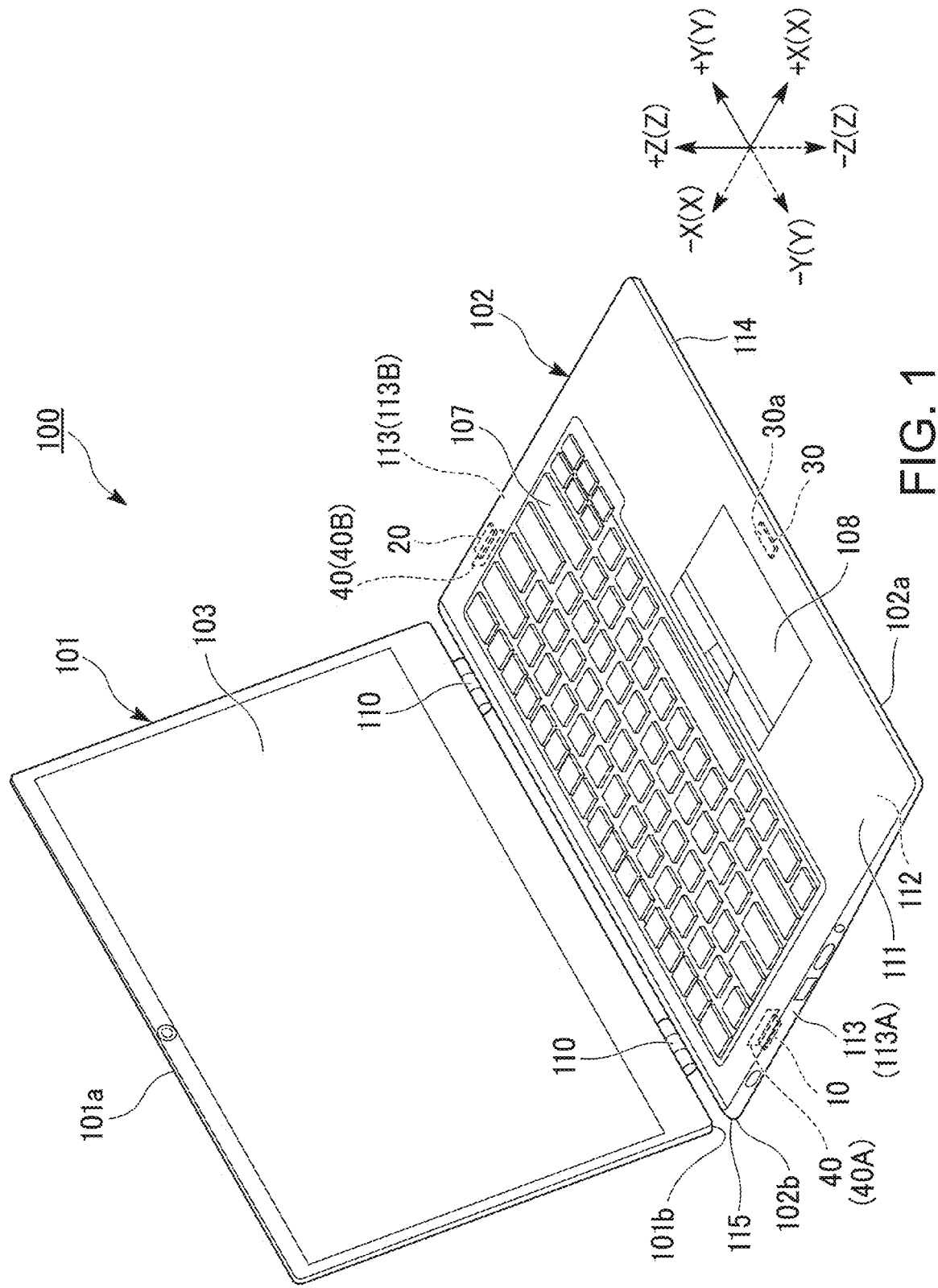
FIG. 1 is a perspective view of an electronic apparatus according to a first embodiment.
Figure 2:
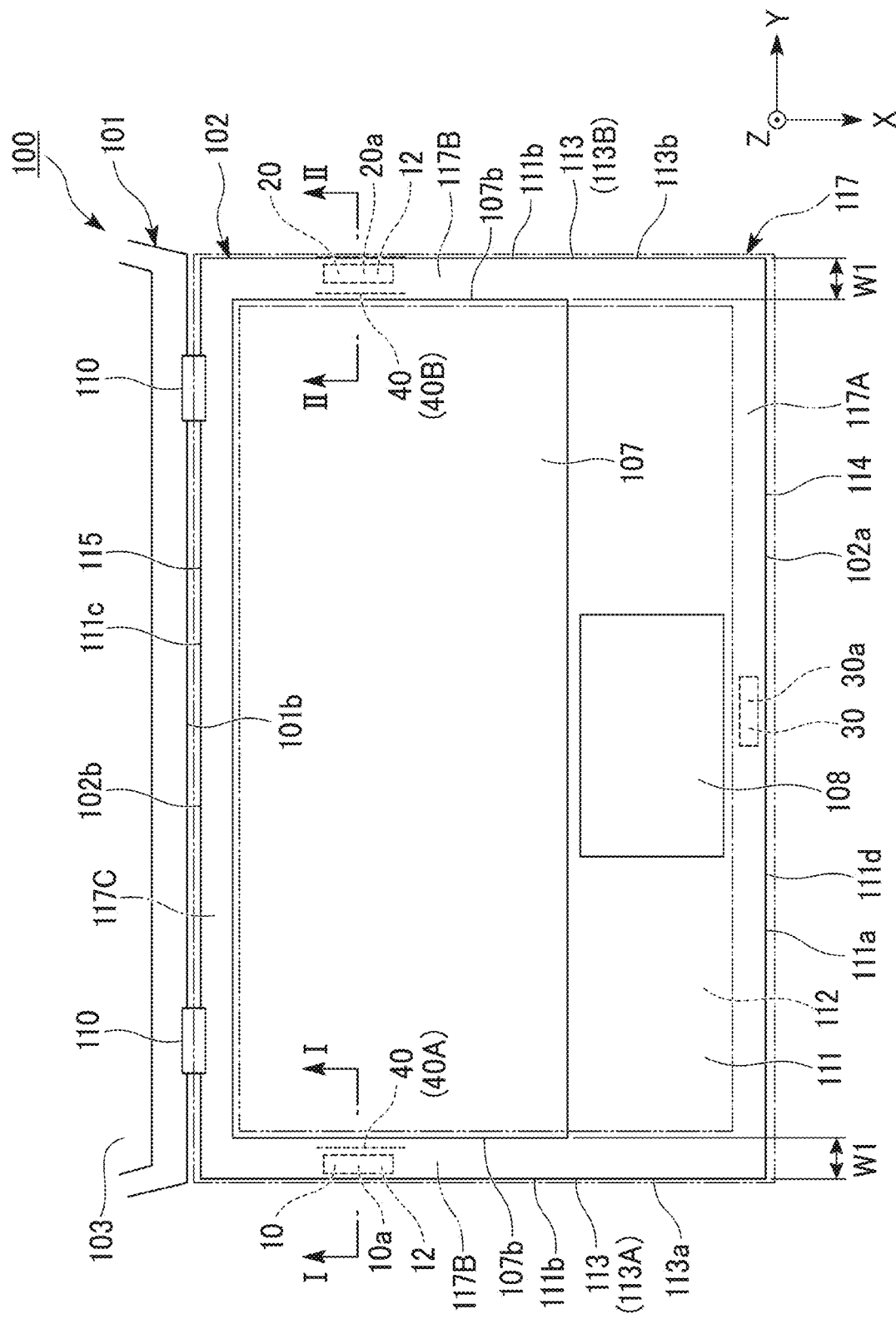
FIG. 2 is a plan view of a second chassis of the electronic apparatus according to the first embodiment.
Figure 3:
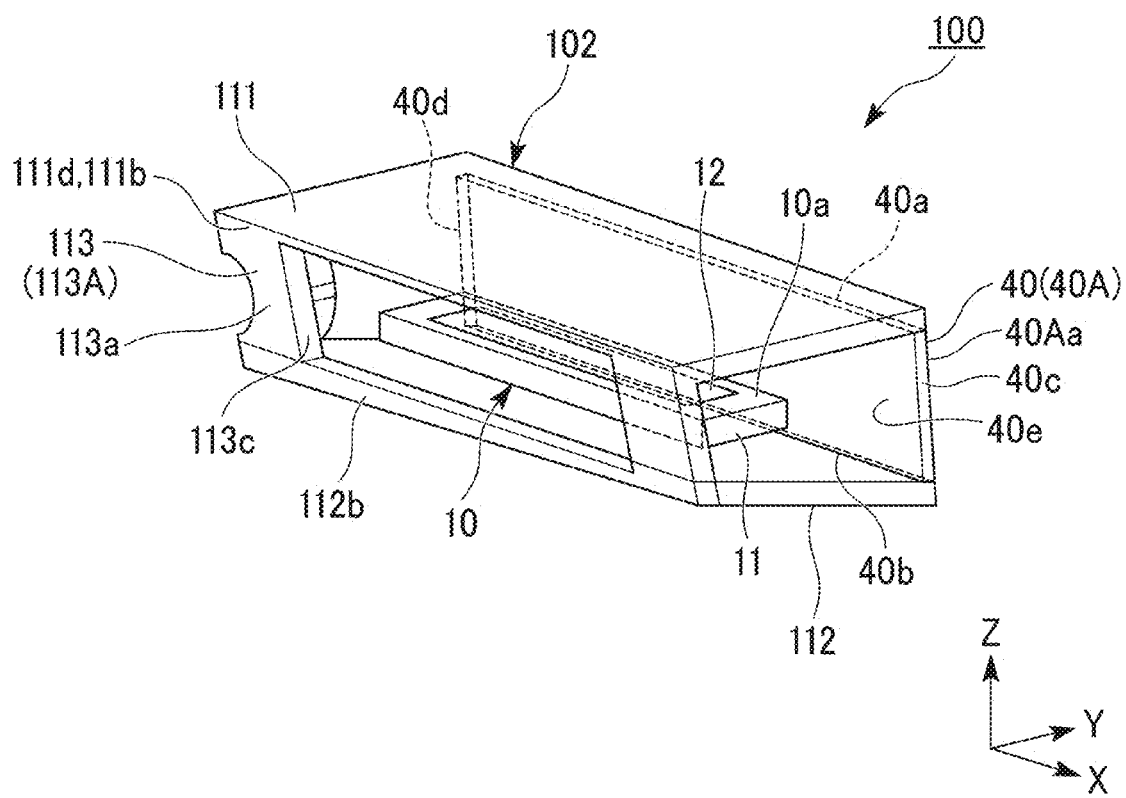
FIG. 3 is a perspective view illustrating the internal structure of the electronic apparatus according to the first embodiment.
Figure 4:
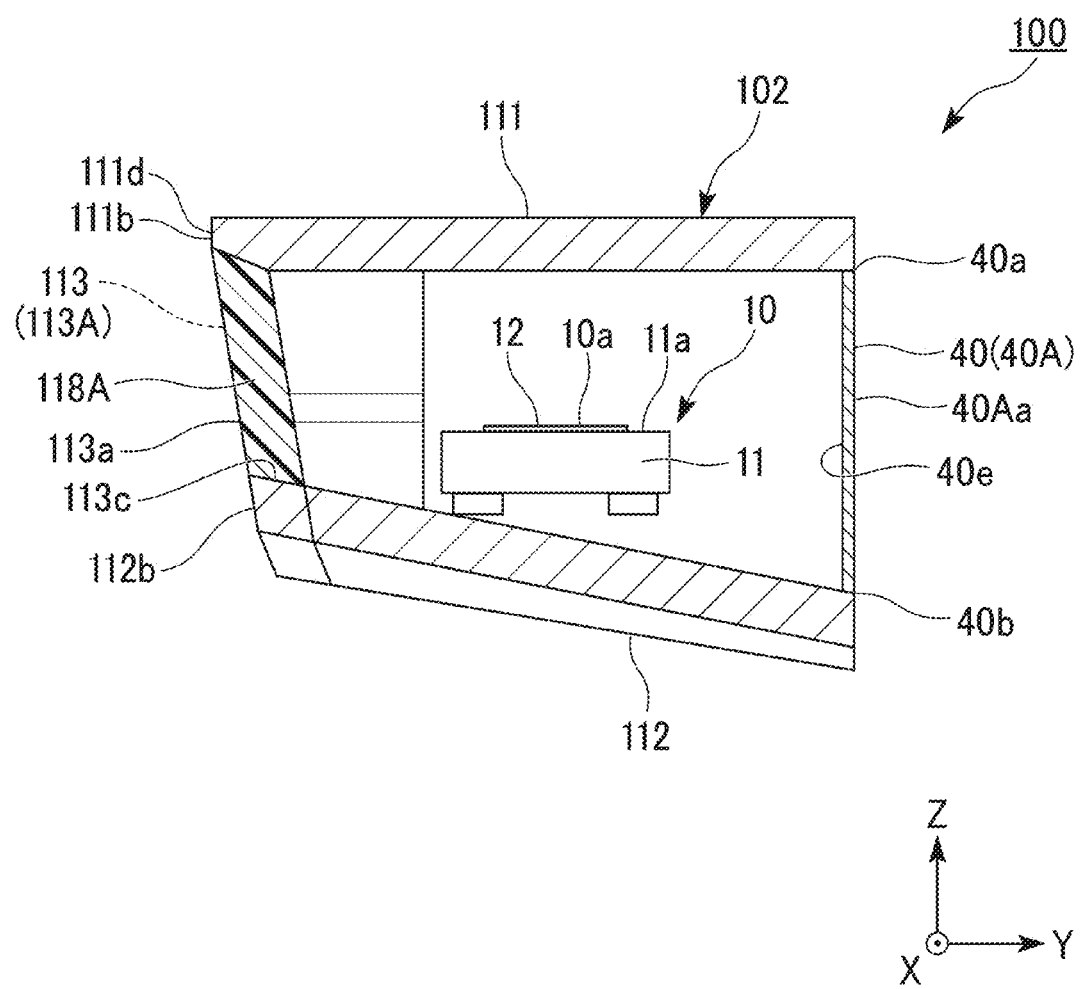
FIG. 4 is a sectional view illustrating the internal structure of the electronic apparatus according to the first embodiment.
Figure 5:
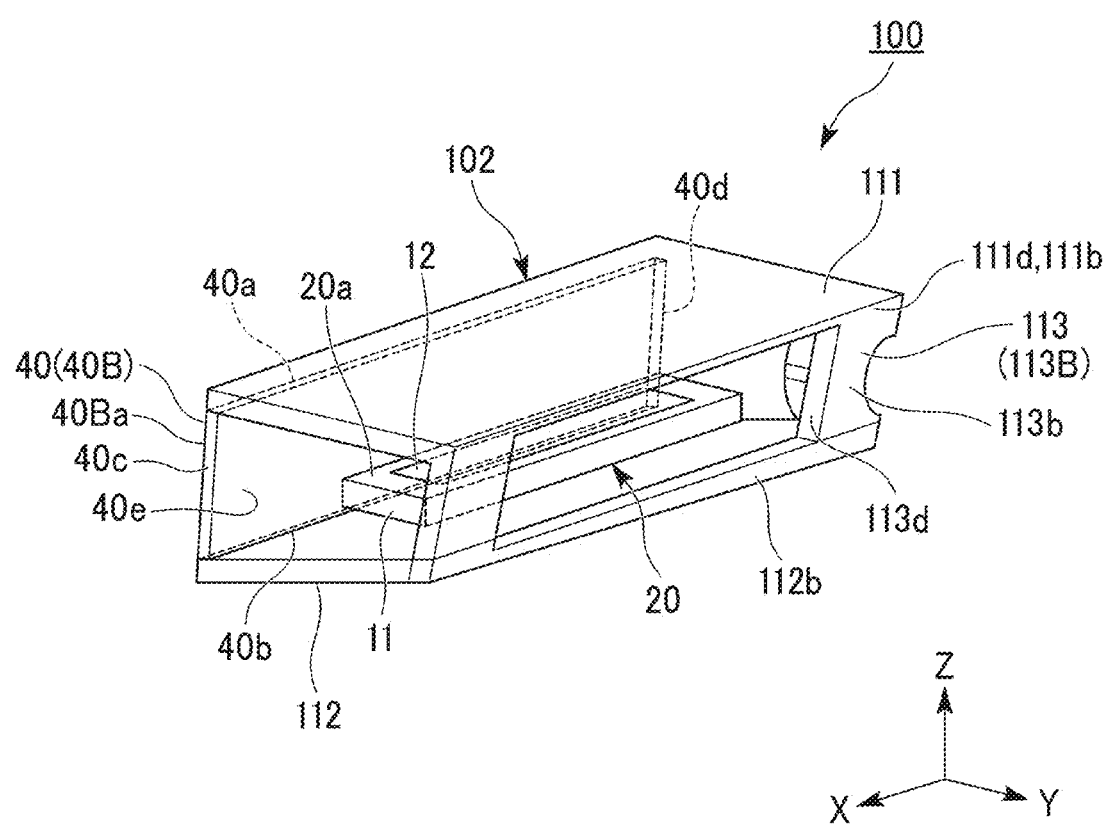
FIG. 5 is a perspective view illustrating the internal structure of the electronic apparatus according to the first embodiment.
Figure 6:
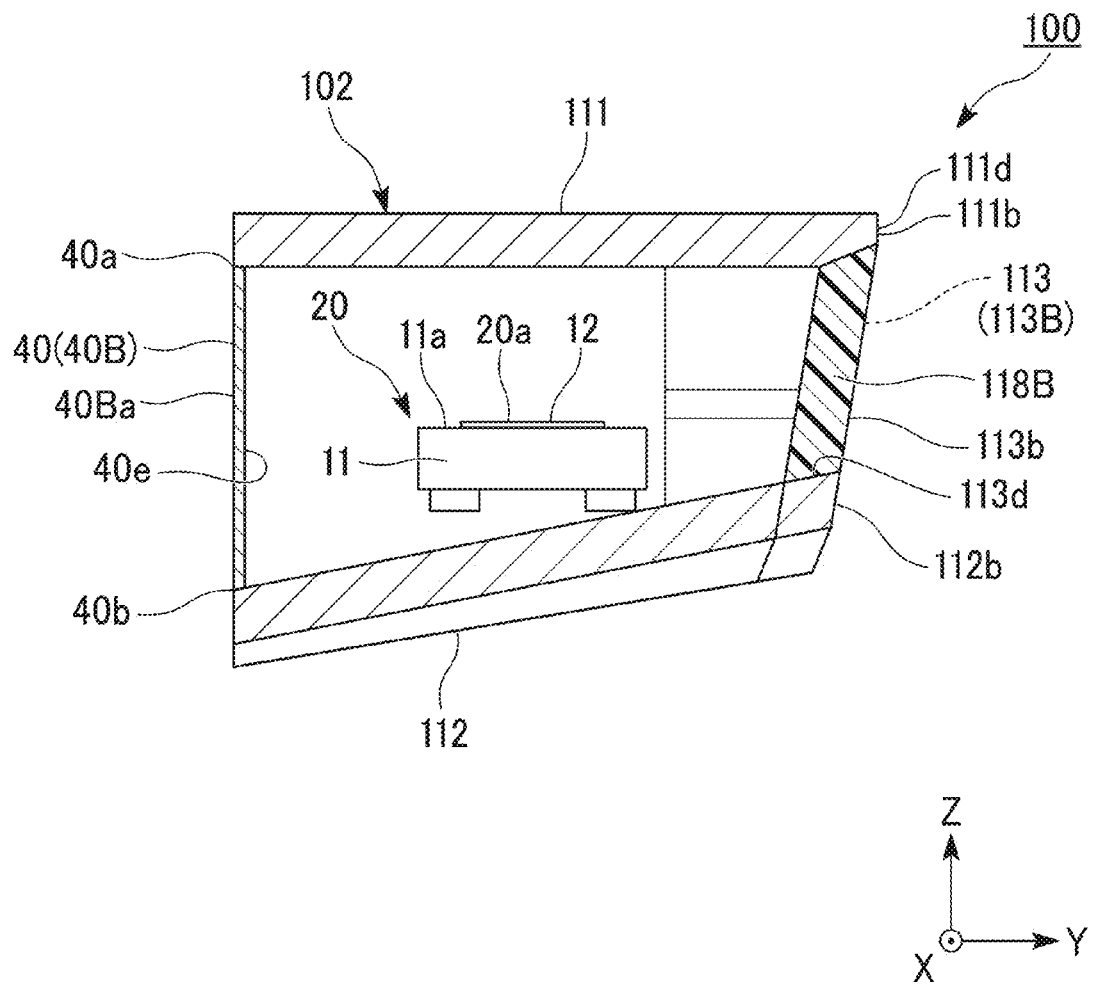
FIG. 6 is a sectional view illustrating the internal structure of the electronic apparatus according to the first embodiment.

An electronic apparatus according to an embodiment will be described. FIG. 1 is a perspective view of an electronic apparatus 100 according to a first embodiment. FIG. 2 is a plan view of a second chassis 102 of the electronic apparatus 100. FIG. 3 is a perspective view illustrating the internal structure of the electronic apparatus 100. FIG. 4 is a partial sectional view along I-I in FIG. 2. FIG. 5 is a perspective view illustrating the internal structure of the electronic apparatus 100. FIG. 6 is a sectional view illustrating the internal structure of the electronic apparatus 100. FIG. 6 is a partial sectional view along II-II in FIG. 2.

As illustrated in FIG. 1, the electronic apparatus 100 includes a first chassis 101, a second chassis 102 (chassis), first to third antennas 10, 20, 30, and a pair of reflection members 40, 40. The electronic apparatus 100 is, for example, a laptop PC (personal computer).

The first chassis 101 and the second chassis 102 are coupled along both edges through hinge mechanisms 110. The first chassis 101 is rotatable around an axis of rotation formed by the hinge mechanisms 110 relative to the second chassis 102.

The first chassis 101 is also called a display chassis. The second chassis 102 is also called a system chassis. The first chassis 101 and the second chassis 102 are each formed in the shape of a rectangular plate. Among the edges of the first chassis 101 and the second chassis 102, the edges on which the hinge mechanisms 110 are provided are called a first base end section 101b and a second base end section 102b, respectively. The edges opposite to the first base end section 101b and the second base end section 102b are called a first open end section 101a and a second open end section 102a, respectively.

In the second chassis 102, the direction from the second base end section 102b to the second open end section 102a is called "forward." The direction opposite to the forward is called "rearward." The forward and rearward directions are collectively referred to as a "longitudinal direction." The left and right directions in FIG. 2 are called "leftward" and "rightward," respectively. The leftward and rightward directions are collectively referred to as a "lateral direction."

As for the second chassis 102, the positional relationships among respective components may be described by using an XYZ orthogonal coordinate system. The X direction is the longitudinal direction. The +X direction is the forward direction. The -X direction is the rearward direction. The Y direction is the lateral direction orthogonal to the X direction. The +Y direction is the rightward direction. The -Y direction is the leftward direction. The second base end section 102b extends in the Y direction. The Z direction is the thickness direction of the second chassis 102, which is a direction orthogonal to the X direction and the Y direction. The +Z direction is an upward direction. The -Z direction is a downward direction. The Z direction is a vertical direction, that is, a height direction. Viewing from the Z direction (the vertical direction) is called plan view.

The first chassis 101 is equipped with a display 103. The display 103 is, for example, a liquid crystal display, an organic EL (Electro-Luminescence) display, or the like.

The second chassis 102 has an upper plate 111 (first main plate), a lower plate 112 (second main plate), a pair of side plates 113, 113, a front plate 114, and a rear plate 115. The second chassis 102 is a plate-like case body. The second chassis 102 is, for example, made of a metal such as an aluminum alloy or a magnesium alloy.

The upper plate 111 is formed along the XY plane. The upper plate 111 and the lower plate 112 face each other with a space. The upper plate 111 has a rectangular shape in plan view.

The lower plate 112 faces a mounting surface when the second chassis 102 is placed on the mounting surface (the upper surface of a desk or the lie). The lower plate 112 has a rectangular shape in plan view.

As illustrated in FIG. 3 and FIG. 4, one side plate 113 (first side plate 113A) in the pair of side plates 113 is formed from a left side edge 111b of the upper plate 111 to a left side edge 112b of the lower plate 112. The outer surface of the first side plate 113A is called a first side face 113a (side face).

A first window 113c is formed in the first side plate 113A at a position corresponding to the first antenna 10. The first window 113c is formed in the thickness direction to penetrate the first side plate 113A. The first window 113c has a rectangular shape (for example, the shape of a non-square rectangle). The first window 113c is formed to include a first main surface 10a of the first antenna 10 as viewed from the lateral direction (Y direction).

As illustrated in FIG. 5 and FIG. 6, the other side plate 113 (second side plate 113B) in the pair of side plates 113 is formed from a right side edge 111b of the upper plate 111 to a right side edge 112b of the lower plate 112. The outer surface of the second side plate 113B is called a second side face 113b (side face).

A second window 113d is formed in the second side plate 113B at a position corresponding to the second antenna 20. The second window 113d is formed in the thickness direction to penetrate the second side plate 113B. The second window 113d has a rectangular shape (for example, the shape of a non-square rectangle). The second window 113d is formed to include a second main surface 20a of the second antenna 20 as viewed from the lateral direction (Y direction).

A radio wave transmission part 118A (see FIG. 4) is provided in the first window 113c (see FIG. 3). A radio wave transmission part 118B (see FIG. 6) is provided in the second window 113d (see FIG. 5). The radio wave transmission parts 118A, 118B each have a plate-like shape and allow radio waves to be transmitted therethrough. The radio wave transmission parts 118A, 118B close the windows 113c, 113d, respectively. Providing the radio wave transmission parts 118A, 118B can prevent foreign matter from entering the second chassis 102 through the windows 113c, 113d.

The radio wave transmission part 118A is included in the first side plate 113A. The outer surface of the radio wave transmission part 118A is included in the first side face 113a. At least part of the first side face 113a allows radio waves to be transmitted therethrough. The radio wave transmission part 118B is included in the second side plate 113B. The outer surface of the radio wave transmission part 118B is included in the second side face 113b. At least part of the second side face 113b allows radio waves to be transmitted therethrough. Note that the radio wave transmission parts 118A, 118B are not illustrated in FIG. 3 and FIG. 5. The whole of the first side plate 113A may be formed as the radio wave transmission part 118A. Likewise, the whole of the second side plate 113B may be formed as the radio wave transmission part 118B.

The radio wave transmission parts 118A, 118B are made of a material to allow radio waves to be transmitted therethrough. As the material to allow radio waves to be transmitted therethrough, there is a resin, for example, a thermosetting resin such as an epoxy resin. It is preferred that the material to allow radio waves to be transmitted therethrough be a fiber reinforced resin obtained by impregnating the resin into fiber such as glass fiber or carbon fiber. The material to allow radio waves to be transmitted therethrough is, for example, an insulating material.

As illustrated in FIG. 1, the front plate 114 is formed from the front end of the upper plate 111 to the front end of the lower plate 112. The rear plate 115 is formed from the rear end of the upper plate 111 to the rear end of the lower plate 112.

The second chassis 102 is equipped with a keyboard 107 and a touch pad 108. The keyboard 107 and the touch pad 108 are input devices.

As illustrated in FIG. 2, an area having a rectangular frame shape including an outer peripheral edge 111d of the upper plate 111 in plan view is called an outer peripheral edge area 117. The outer peripheral edge area 117 is composed of a front area 117A, a pair of side areas 117B, 117B, and a rear area 117C.

The front area 117A is a linear strip area including a front edge 111a of the upper plate 111. The front area 117A is an area over the entire length of the upper plate 111 in the lateral direction, that is, an area extending from one side edge 111b of the upper plate 111 to the other side edge 111b in the Y direction.

The side areas 117B, 117B are linear strip areas including the side edges 111b, 111b of the upper plate 111, respectively. The side areas 117B, 117B are areas over the entire length of the upper plate 111 in the longitudinal direction, that is, areas extending from the front edge 111a to a rear edge 111c in the X direction. The side areas 117B, 117B extend rearward from both ends of the front area 117A, respectively. For example, the width W1 of the side area 117B is equal to or smaller than the distance between a side edge 107b of the keyboard 107 and the side edge 111b opposite thereto.

The rear area 117C is a linear strip area including the rear edge 111c of the upper plate 111. The rear area 117C is formed over the entire length of the upper plate 111 in the lateral direction. The rear area 117C extends from the rear end of one side area 117B to the rear end of the other side area 117B in the Y direction.

The outer peripheral edge area 117 is, for example, an area not including the keyboard 107 in plan view. The width of the front area 117A, the width of each of the side areas 117B, 117B, and the width of the rear area 117C are equal to one another.

Electronic components such as a circuit board, a central processing unit, a memory, and a battery are provided inside the second chassis 102. Some of these electronic components are located inside the outer peripheral edge area 117 (see FIG. 2) in plan view.

As illustrated in FIG. 3 and FIG. 4, the first antenna 10 is an antenna for wireless communication.

As illustrated in FIG. 2, the first antenna 10 is provided inside the second chassis 102 at a position included in the outer peripheral edge area 117 in plan view. Specifically, the first antenna 10 is provided at a position included in the side area 117B. Since the first antenna 10 is provided at the position included in the outer peripheral edge area 117 in plan view, the first antenna 10 is arranged close to the outer peripheral edge of the second chassis 102. This makes it easy for radio waves from the outside to reach the first antenna 10 without being attenuated. This also makes it easy for radio waves radiated from the first antenna 10 to be radiated to the outside without being attenuated. Thus, the transmission/reception characteristics of the antenna 10 (at least either of the transmission and reception characteristics) can be enhanced.

As illustrated in FIG. 3 and FIG. 4, the first antenna 10 is formed into a rectangular plate shape (for example, the shape of a non-square rectangular plate) as a whole. The first antenna 10 is so placed that the long side thereof faces in the longitudinal direction.

The first antenna 10 includes a body part 11 and a radio wave transmission/reception part 12. The body part 11 includes a substrate having an RF circuit and the like. The body part 11 is formed into a rectangular plate shape (for example, the shape of a non-square rectangular plate).

The radio wave transmission/reception part 12 includes one or more antenna elements. The antenna elements can deal with radio waves in a millimeter wave band. In other words, the antenna elements can perform at least either the transmission or reception of radio waves in the millimeter wave band. For example, the radio waves in the millimeter wave band mean radio waves in a frequency band of 24 GHz to 100 GHz. The radio wave transmission/reception part 12 is provided on one face of the body part 11 having a plate shape, that is, on a first main surface 11a (see FIG. 4). Therefore, the radio wave transmission/reception part 12 constitutes at least part of one surface of the first antenna 10 (the first main surface 10a as the upper surface in FIG. 4).

The first antenna 10 is so placed that the first main surface 10a faces the upper plate 111. Thus, the first antenna 10 is so placed that the radio wave transmission/reception part 12 faces the upper plate 111. For example, the first antenna 10 becomes parallel (or substantially parallel) to the upper plate 111. When the second chassis 102 is placed on a horizontal mounting surface, the upper plate 111 is positioned horizontally and the first antenna 10 is also positioned horizontally. Although it is desired that the first main surface 10a be parallel to the upper plate 111, the first main surface 10a may be inclined, for example, at an angle of more than 0° and less than 45° with respect to the upper plate 111.

A first reflection member 40A as one reflection member 40 of the pair of reflection members 40, 40 is formed into a rectangular plate shape (for example, the shape of a non-square rectangular plate). The whole of the first reflection member 40A is a main part 40Aa. The first reflection member 40A is so placed that the long side thereof faces in the longitudinal direction.

An upper edge 40a of the first reflection member 40A reaches the upper plate 111. A lower edge 40b of the first reflection member 40A reaches the lower plate 112. The first reflection member 40A is in contact with the upper plate 111 and the lower plate 112 on the upper edge 40a and the lower edge 40b in a heat transferable manner. Therefore, the heat of the first reflection member 40A can be transferred to the upper plate 111 and the lower plate 112. This can suppress a rise in temperature of the first reflection member 40A.

The first reflection member 40A may be fixed to at least one of the upper plate 111 and the lower plate 112 on the upper edge 40a or the lower edge 40b.

The first reflection member 40A is formed in a direction to intersect the upper plate 111, for example, along a plane perpendicular to the upper plate 111 (XZ plane).

The first reflection member 40A is provided inside the second chassis 102 at a position more inward than the first antenna 10 (a position on the right side of the first antenna 10). The first reflection member 40A is positioned to face the first antenna 10. One side (reflection surface 40e) of the first reflection member 40A is directed toward the first antenna 10. It is preferred that the first reflection member 40A be put in a position included in the side area 117B (see FIG. 2) in plan view.

Note that the attitude of the first reflection member 40A is not limited to the attitude perpendicular to the upper plate 111 as long as the reflection surface 40e is directed toward the first antenna 10. For example, the first reflection member 40A may be in such an attitude that the reflection surface 40e is inclined at an angle of more than 45° and less than 90° with respect to the upper plate 111. Thus, for example, the first reflection member 40A is so placed that the reflection surface 40e is inclined at an angle of more than 45° but not more than 90° with respect to the upper plate 111.

The first reflection member 40A may be provided away from the first antenna 10 or in contact with the first antenna 10. In the embodiment, the first reflection member 40A is placed away from the first antenna 10.

The first reflection member 40A is placed to cover the first main surface 10a of the first antenna 10 as viewed from the lateral direction (Y direction). The upper edge 40a of the first reflection member 40A is in a position higher than the first main surface 10a. The lower edge 40b of the first reflection member 40A is in a position lower than the first main surface 10a. A front edge 40c of the first reflection member 40A is in a position more forward than the front edge of the first main surface 10a. A rear edge 40d of the first reflection member 40A is in a position more rearward than the rear edge of the first main surface 10a. Thus, the first reflection member 40A is placed to include the first main surface 10a as viewed from the lateral direction (Y direction).

Since the first reflection member 40A is in the position to cover the first main surface 10a of the first antenna 10 as viewed from the lateral direction (Y direction), it can be said that the first antenna 10 is sandwiched between the first reflection member 40A and the first side face 113a.

"The first antenna 10 is sandwiched between the first reflection member 40A and the first side face 113a" means that at least part of the first reflection member 40A and at least part of the first side face 113a are positioned to overlap each other with the first antenna 10 therebetween as viewed from the Y direction.

The reflection member 40 has conductivity. The reflection member 40 is such that at least the reflection surface 40e is made of a conductive material. As the conductive material, a metal, a carbon material, or the like is used. Metals of which the reflection member 40 can be made include aluminum, copper, stainless steel, titanium, and alloys of them. When a metal is used as a constituent material of the reflection member 40, the radio wave reflection characteristics of the reflection member 40 can be enhanced. The reflection member 40 may also be constructed to include a body made of a non-conductive material (resin, glass, or the like) and a metal layer formed on at least one surface (reflection surface) of the body.

Part of radio waves radiated from the side (from the left) to the electronic apparatus 100 enters the inside of the second chassis 102 through the first window 113c of the first side plate 113A, and is received by the radio wave transmission/reception part 12 of the first antenna 10. Part of the radio waves passing through the first antenna 10 reaches the first reflection member 40A, and is reflected on the reflection surface 40e. The radio waves reflected on the reflection surface 40e are headed to the left, and part of the radio waves is received by the radio wave transmission/reception part 12 of the first antenna 10.

Part of radio waves radiated from the radio wave transmission/reception part 12 of the first antenna 10 is headed to the left, and radiated to the outside directly through the first window 113c. The remaining radio waves are headed to the right and reflected on the reflection surface 40e of the first reflection member 40A. The radio waves reflected on the reflection surface 40e are headed to the left and radiated to the outside through the first window 113c.

As illustrated in FIG. 5 and FIG. 6, the second antenna 20 is an antenna for wireless communication. The second antenna 20 has the same structure as that of the first antenna 10 (see FIG. 3 and FIG. 4).

As illustrated in FIG. 2, the second antenna 20 is provided inside the second chassis 102 at a position included in the outer peripheral edge area 117 in plan view. Specifically, the second antenna 20 is provided at a position included in the side area 117B. Like the first antenna 10, since the second antenna 20 is provided at the position included in the outer peripheral edge area 117 in plan view, the transmission/reception characteristics can be enhanced.

As illustrated in FIG. 5 and FIG. 6, the radio wave transmission/reception part 12 of the second antenna 20 constitutes at least part of one surface of the second antenna 20 (the second main surface 20a as the upper surface in FIG. 6).

The second antenna 20 is so placed that the second main surface 20a faces the upper plate 111. Thus, the second antenna 20 is so placed that the radio wave transmission/reception part 12 faces the upper plate 111. For example, the second antenna 20 is positioned in parallel (substantially in parallel) to the upper plate 111. When the second chassis 102 is placed on a horizontal mounting surface, the upper plate 111 is positioned horizontally and the second antenna 20 is also positioned horizontally. Although it is desired that the second main surface 20a be parallel to the upper plate 111, the second main surface 20a may be inclined, for example, at an angle of more than 0° and less than 45° with respect to the upper plate 111.

A second reflection member 40B as the other reflection member 40 of the pair of reflection members 40, 40 is formed into a rectangular plate shape (for example, the shape of a non-square rectangular plate). The whole of the second reflection member 40B is a main part 40Ba. The second reflection member 40B has the same structure as the first reflection member 40A.

An upper edge 40a of the second reflection member 40B reaches the upper plate 111. A lower edge 40b of the second reflection member 40B reaches the lower plate 112. The second reflection member 40B is in contact with the upper plate 111 and the lower plate 112 on the upper edge 40a and the lower edge 40b in a heat transferable manner. The second reflection member 40B may be fixed to at least one of the upper plate 111 and the lower plate 112 on the upper edge 40a or the lower edge 40b.

The second reflection member 40B is formed in a direction to intersect the upper plate 111, for example, along a plane (XZ plane) perpendicular to the upper plate 111.

The second reflection member 40B is provided inside the second chassis 102 at a position more inward than the second antenna 20 (a position on the left side of the second antenna 20). The second reflection member 40B is positioned to face the second antenna 20. One side (reflection surface 40e) of the second reflection member 40B is directed toward the second antenna 20. It is preferred that the second reflection member 40B be put in a position included in the side area 117B (see FIG. 2) in plan view.

Note that the attitude of the second reflection member 40B is not limited to the attitude perpendicular to the upper plate 111 as long as the reflection surface 40e is directed toward the second antenna 20. For example, the second reflection member 40B may be in such an attitude that the reflection surface 40e is inclined at an angle of more than 45° and less than 90° with respect to the upper plate 111. Thus, for example, the second reflection member 40B is so placed that the reflection surface 40e is inclined at an angle of more than 45° but not more than 90° with respect to the upper plate 111.

The second reflection member 40B may be provided away from the second antenna 20 or in contact with the second antenna 20. In the embodiment, the second reflection member 40B is placed away from the second antenna 20.

The second reflection member 40B is placed to cover the second main surface 20a of the second antenna 20 as viewed from the lateral direction (Y direction). The upper edge 40a of the second reflection member 40B is in a position higher than the second main surface 20a. The lower edge 40b of the second reflection member 40B is in a position lower than the second main surface 20a. A front edge 40c of the second reflection member 40B is in a position more forward than the front edge of the second main surface 20a. A rear edge 40d of the second reflection member 40B is in a position more rearward than the rear edge of the second main surface 20a. Thus, the second reflection member 40B is placed to include the second main surface 20a as viewed from the lateral direction (Y direction).

Since the second reflection member 40B is in the position to cover the second main surface 20a of the second antenna 20 as viewed from the lateral direction (Y direction), it can be said that the second antenna 20 is sandwiched between the second reflection member 40B and the second side face 113b.

"The second antenna 20 is sandwiched between the second reflection member 40B and the second side face 113b" means that at least part of the second reflection member 40B and at least part of the second side face 113b are positioned to overlap each other with the second antenna 20 therebetween as viewed from the Y direction.

Part of radio waves radiated from the side (from the right) to the electronic apparatus 100 enters the inside of the second chassis 102 through the second window 113d of the second side plate 113B, and is received by the radio wave transmission/reception part 12 of the second antenna 20. Part of the radio waves passing through the second antenna 20 reaches the second reflection member 40B, and is reflected on the reflection surface 40e. The radio waves reflected on the reflection surface 40e are headed to the right, and part of the radio waves is received by the radio wave transmission/reception part 12 of the second antenna 20.

Part of radio waves radiated from the radio wave transmission/reception part 12 of the second antenna 20 is headed to the right, and radiated to the outside directly through the second window 113d. The remaining radio waves are headed to the left and reflected on the reflection surface 40e of the second reflection member 40B. The radio waves reflected on the reflection surface 40e are headed to the right and radiated to the outside through the second window 113d.

As illustrated in FIG. 1 and FIG. 2, the third antenna 30 is an antenna for wireless communication. The third antenna 30 has the same structure as that of the first antenna 10 (see FIG. 3 and FIG. 4). As illustrated in FIG. 2, the third antenna 30 is provided inside the second chassis 102 at a position included in the front area 117A in plan view.

The radio wave transmission/reception part 12 of the third antenna 30 constitutes at least part of one side (a third main surface 30a) of the third antenna 30.

The third antenna 30 is so placed that the third main surface 30a faces the upper plate 111. An area of the upper plate 111 to face the third antenna 30 is formed as a radio wave transmission part (not illustrated) to allow radio waves to be transmitted therethrough. The radio wave transmission part is made of a material to allow radio waves to be transmitted therethrough such as a synthetic resin.

Part of radio waves radiated from above to the electronic apparatus 100 is received by the third antenna 30 through the radio wave transmission part. Part of radio waves radiated by the third antenna 30 is radiated to the outside through the radio wave transmission part.

According to the electronic apparatus 100 of the embodiment, the first reflection member 40A is so placed that the first antenna 10 is arranged between the first reflection member 40A and the side face 113a in plan view. The second reflection member 40B is so placed that the second antenna 20 is arranged between the second reflection member 40B and the side face 113b in plan view. The reflection members 40A, 40B are so placed that the reflection surfaces 40e, 40e are directed toward the antennas 10, 20, respectively. Therefore, even when part of radio waves entering the second chassis 102 from the sides once passes through the antennas 10, 20, it is reflected back on the reflection members 40 and received by the antennas 10, 20, respectively. Although part of radio waves radiated from each of the antennas 10, 20 is headed to the inside of the second chassis 102, this radio wave is reflected on the reflection member 40, directed toward the outside, and radiated to the outside. Thus, the transmission/reception characteristics (for example, the directivity) of the antennas 10, 20 can be enhanced.

In the electronic apparatus 100, since each of the antennas 10, 20 is so placed that the radio wave transmission/ reception part 12 faces the upper plate 111, the degree of freedom in design related to the attitude and mounting position of the antenna 10, 20, and the like can be increased. For example, since the antenna 10, 20 can be positioned along the upper plate 111, the antenna 10, 20 can be placed in a portion in which the height of the interior space of the second chassis 102 is small. This can make the second chassis 102 thinner.

Figure 7:
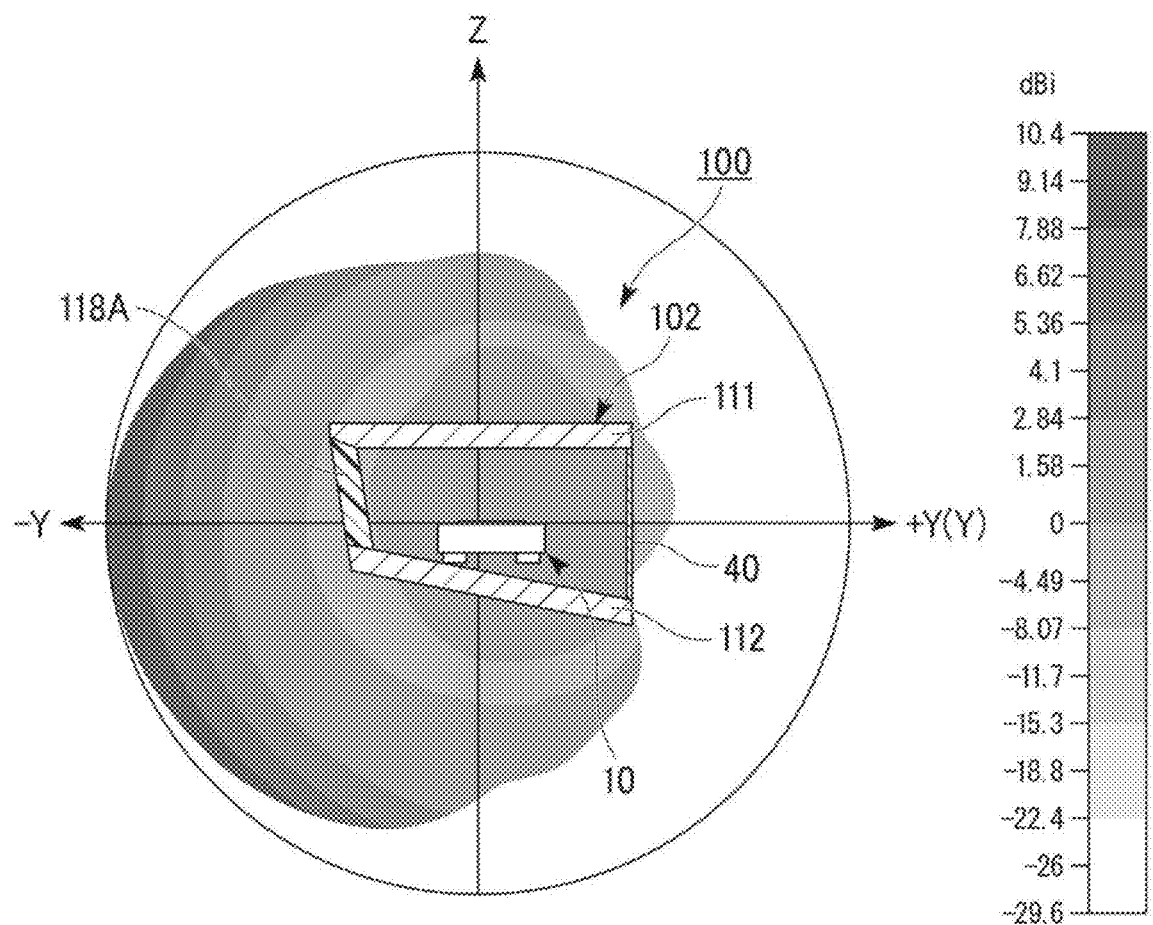
FIG. 7 is a diagram illustrating an example of a radiation pattern of radio waves of an antenna in the electronic apparatus according to the first embodiment.

FIG. 7 is a diagram illustrating an example of a radiation pattern of radio waves of the antenna 10 in the electronic apparatus 100. As illustrated in FIG. 7, in the electronic apparatus 100, the directivity of the first antenna 10 to the side (to the left in FIG. 7, that is, in the −Y direction) is high.

To clarify the effect of the electronic apparatus 100, an electronic apparatus as a comparative form will be illustrated.

Figure 8:
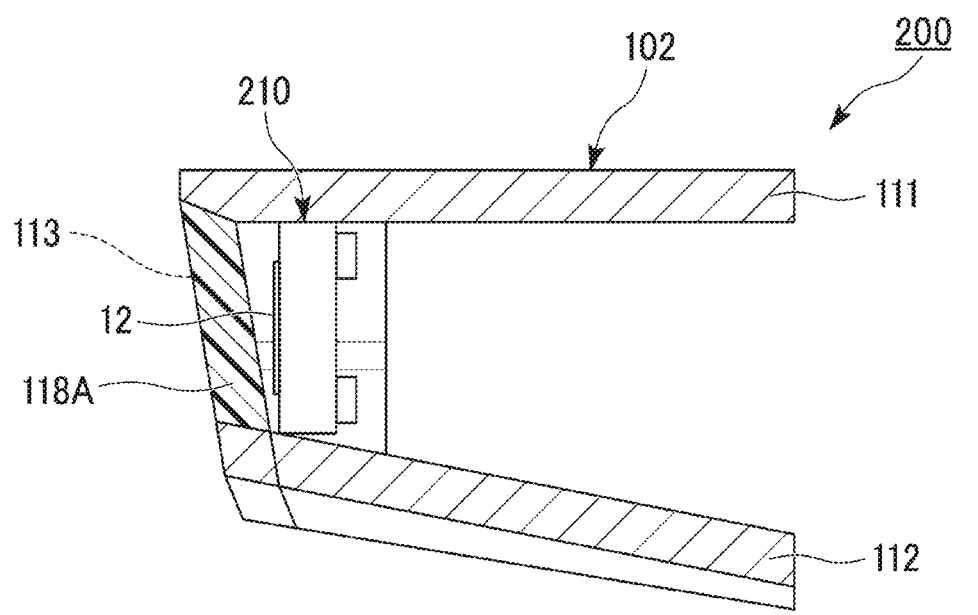
FIG. 8 is a sectional view illustrating the internal structure of an electronic apparatus according to a first comparative form.

FIG. 8 is a sectional view illustrating the internal structure of an electronic apparatus 200 according to a first comparative form. As illustrated in FIG. 8, in the electronic apparatus 200, an antenna 210 is so placed vertically that the radio wave transmission/reception part 12 faces outward. No reflection member is provided in this form.

Figure 9:
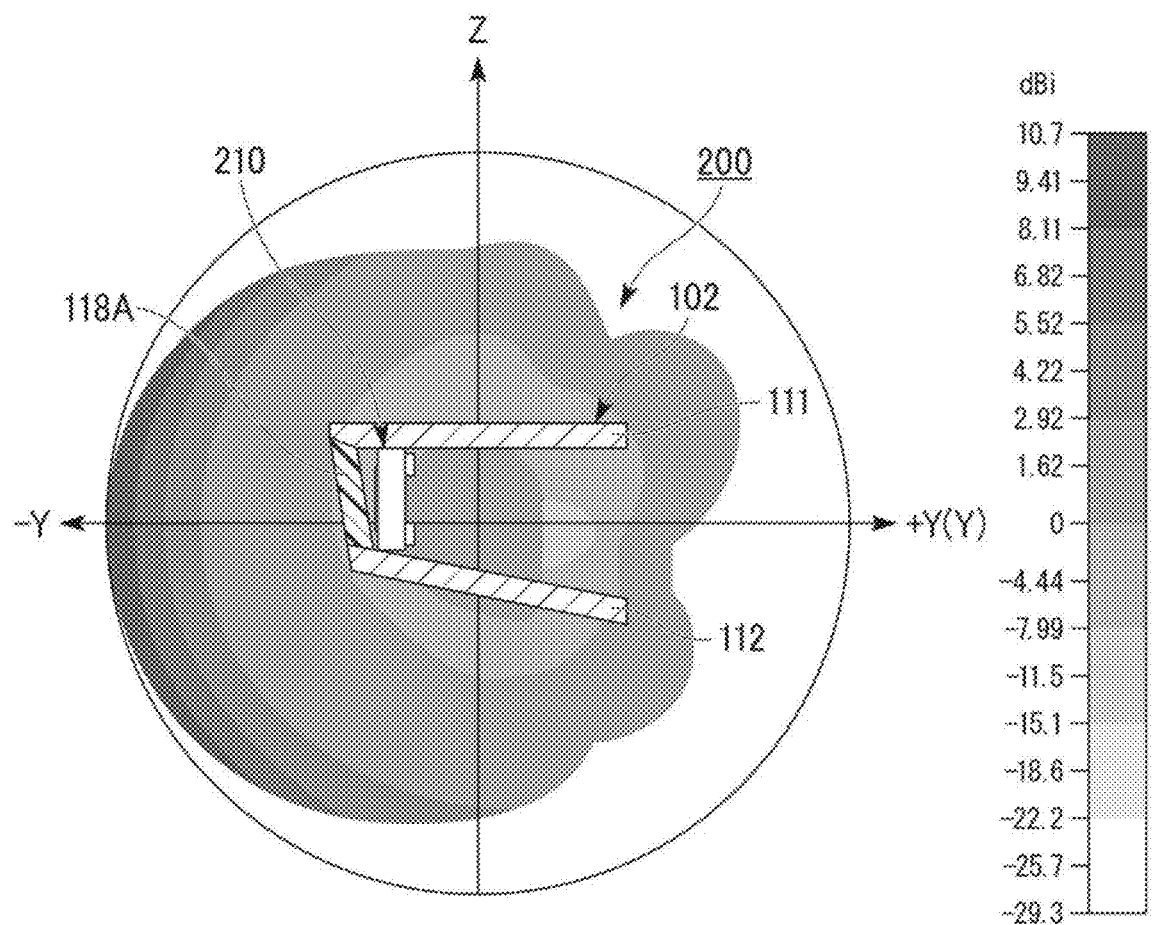
FIG. 9 is a diagram illustrating an example of a radiation pattern of radio waves of an antenna in the electronic apparatus according to the first comparative form.

FIG. 9 is a diagram illustrating an example of a radiation pattern of radio waves of the antenna 210 in the electronic apparatus 200. As illustrated in FIG. 9, the antenna 210 has a high directivity toward one side. However, the antenna 210 is placed vertically, the electronic apparatus 200 is inferior in terms of the degree of freedom in design.

Figure 10:
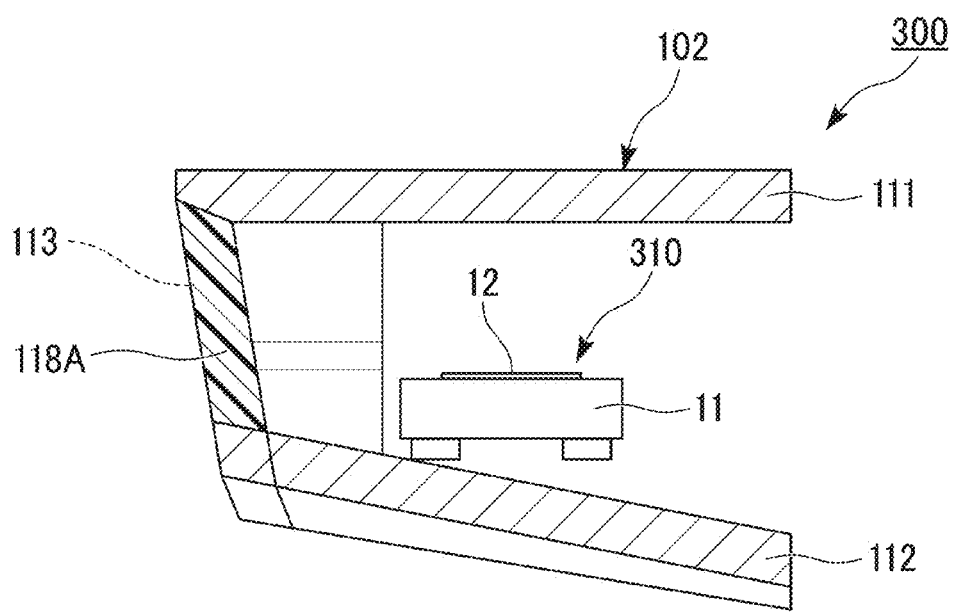
FIG. 10 is a sectional view illustrating the internal structure of an electronic apparatus according to a second comparative form.

FIG. 10 is a sectional view illustrating the internal structure of an electronic apparatus 300 according to a second comparative form. As illustrated in FIG. 10, the electronic apparatus 300 has the same structure as the electronic apparatus 100 illustrated in FIG. 4 except that no reflection member is provided.

Figure 11:
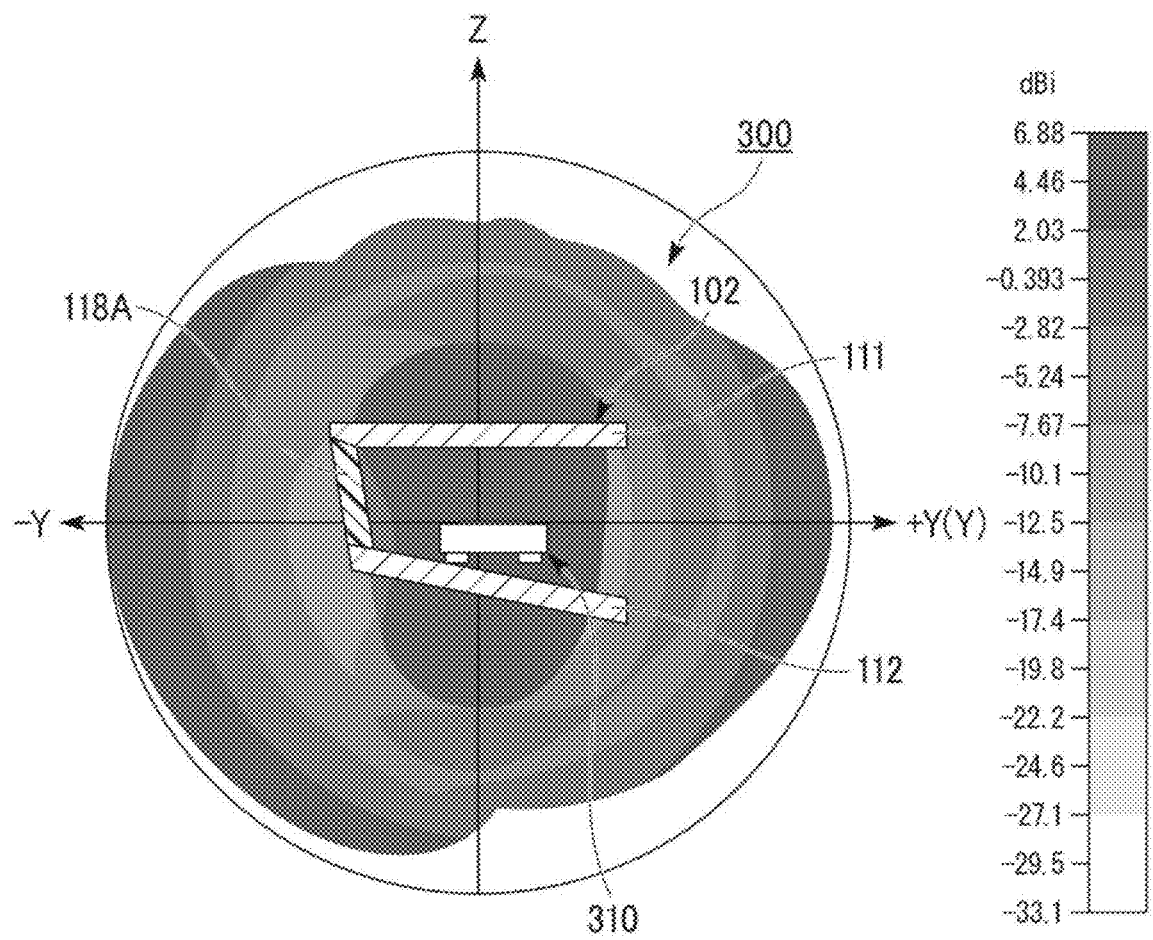
FIG. 11 is a diagram illustrating an example of a radiation pattern of radio waves of an antenna in the electronic apparatus according to the second comparative form.

FIG. 11 is a diagram illustrating an example of a radiation pattern of radio waves of an antenna 310 in the electronic apparatus 300. As illustrated in FIG. 11, the antenna 310 of the electronic apparatus 300 has a low directivity.

By comparing FIG. 7, FIG. 9, and FIG. 11, it is found that the electronic apparatus 100 of the embodiment illustrated in FIG. 7 has a high antenna directivity and can enhance the degree of freedom in design.

Since the reflection members 40 are provided in the electronic apparatus 100, the electromagnetic effects of electronic components (the central processing unit and the like) mounted in the second chassis 102 on the antennas 10, 20 can be suppressed. This can lead to reducing noise in the antennas 10, 20 and hence increase the transmission/reception characteristics.

Since the reflection members 40 are provided in the electronic apparatus 100, the electromagnetic effects between the first antenna 10 and the second antenna 20 can also be suppressed. Further, since the reflection members are provided in the electronic apparatus 100, the electromagnetic effects of any other electronic apparatus on the electronic components inside the second chassis 102 can be suppressed.

[Electronic Apparatus] (First Example of Second Embodiment)

Figure 12:
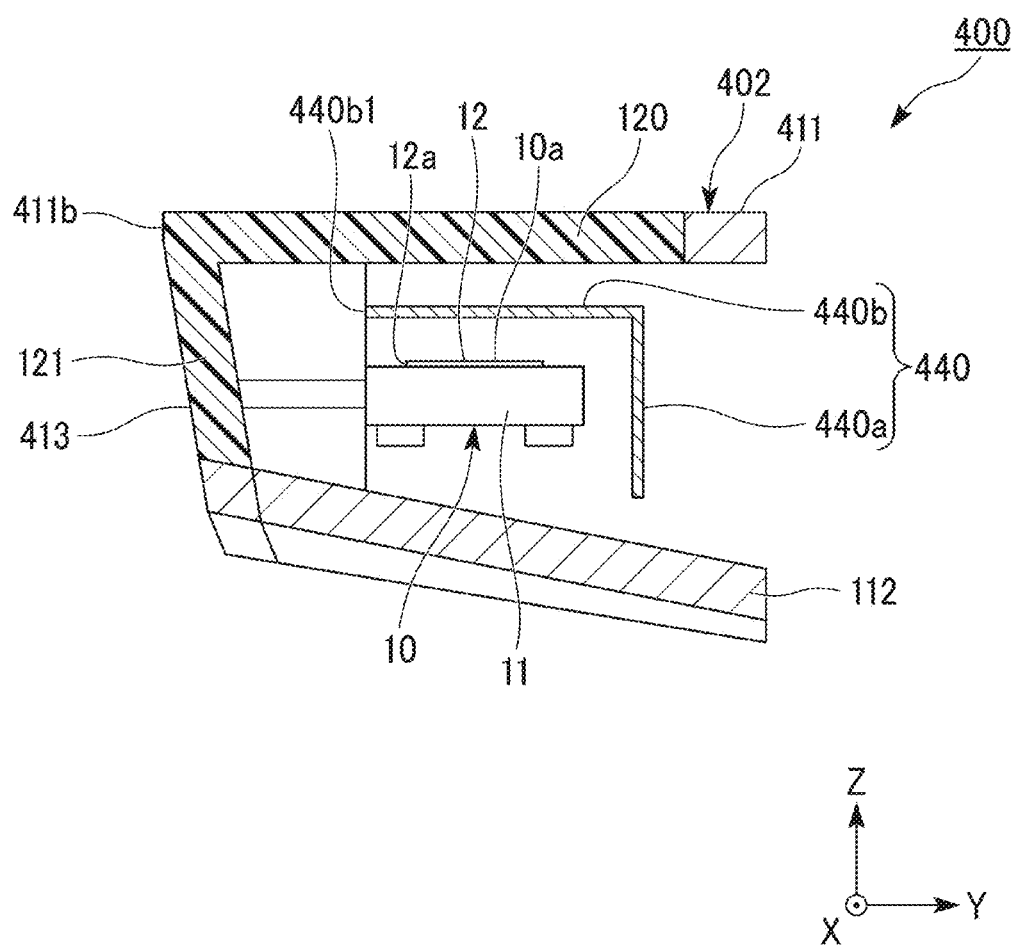
FIG. 12 is a sectional view illustrating the internal structure of a first example of an electronic apparatus according to a second embodiment.

FIG. 12 is a sectional view illustrating the internal structure of an electronic apparatus 400 according to a first example of a second embodiment. Components common to the electronic apparatus of the other embodiment are given the same reference numerals to omit the description thereof.

In the electronic apparatus 400, at least part of an upper plate 411 of a second chassis 402 constitutes a radio wave transmission part 120. The radio wave transmission part 120 is formed in an area including a side edge 411b of the upper plate 411. The radio wave transmission part 120 is made, for example, of a material to allow radio waves to be transmitted therethrough (as described above). The radio wave transmission part 120 includes the whole of the radio wave transmission/reception part 12 of the antenna 10 in plan view.

The second chassis 402 is made of a conductive material such a metal.

At least part of a side plate 413 of the second chassis 402 constitutes a radio wave transmission part 121. The radio wave transmission part 121 is formed in a position corresponding to the antenna 10. The radio wave transmission part 121 is made of a material to allow radio waves to be transmitted therethrough such as a synthetic resin.

The radio wave transmission/reception part 12 of the antenna 10 is arranged to face the radio wave transmission part 120.

A reflection member 440 has a main part 440a and a shielding part 440b. Like the main part 40Aa illustrated in FIG. 4, the main part 440a is formed into a rectangular plate shape. The main part 440a is formed in a direction to intersect the upper plate 411, for example, along a plane (XZ plane) perpendicular to the upper plate 411.

The shielding part 440b is formed into a plate shape (for example, a rectangular plate shape). The shielding part 440b extends from the upper edge of the main part 440a toward a side plate 413 between the antenna 10 and the radio wave transmission part 120. For example, the shielding part 440b is parallel to the upper plate 411.

The shielding part 440b overlaps at least part of the radio wave transmission/reception part 12 of the antenna 10 in plan view. In this example, the shielding part 440b includes almost the whole of the radio wave transmission/reception part 12 of the antenna 10 in plan view. A tip 440b1 of the shielding part 440b is located in a position more leftward than an outer edge 12a of the radio wave transmission/reception part 12.

The reflection member 440 has conductivity. The reflection member 440 is made of a conductive material such as a metal (as described above).

Figure 13:
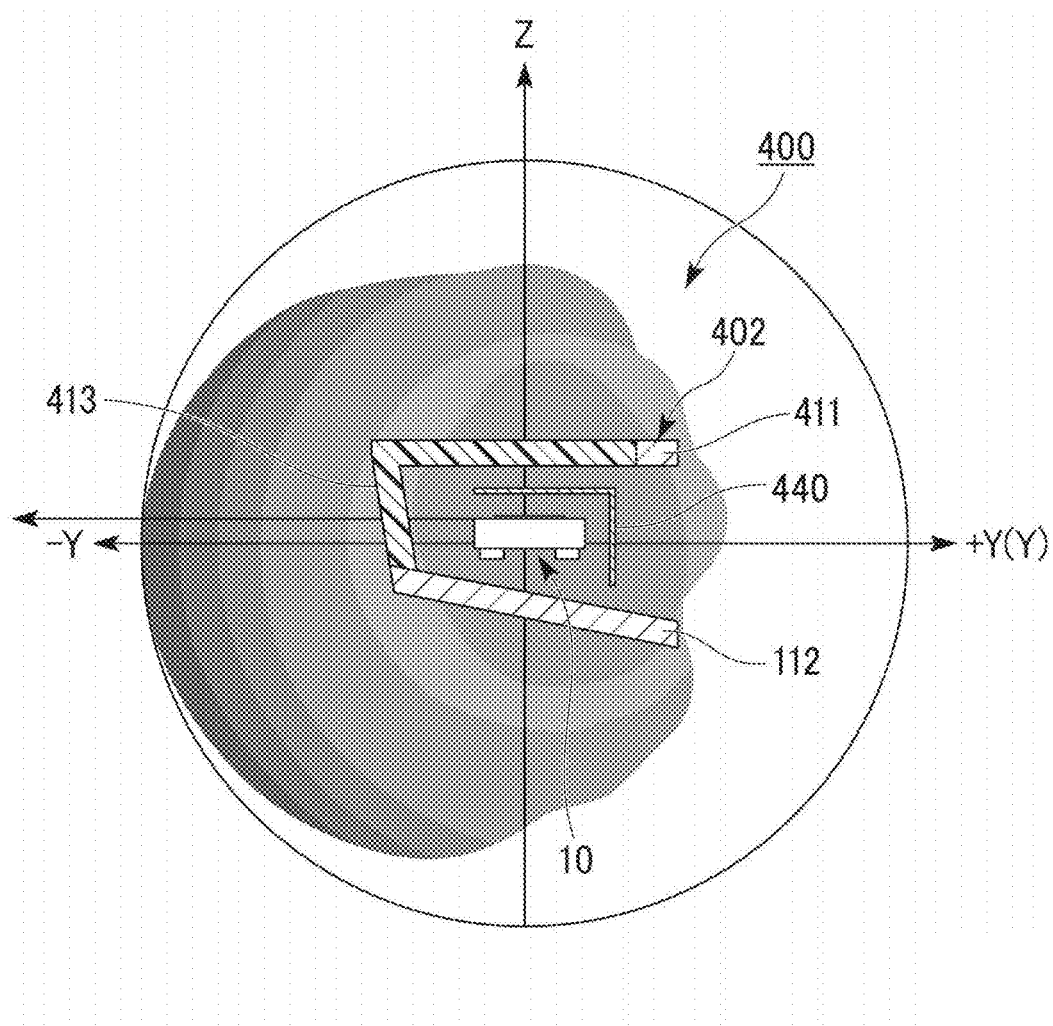
FIG. 13 is a diagram illustrating an example of a radiation pattern of radio waves of an antenna in the first example of the electronic apparatus according to the second embodiment.

FIG. 13 is a diagram illustrating an example of a radiation pattern of radio waves of the antenna 10 in the electronic apparatus 400. As illustrated in FIG. 13, the antenna 10 of the electronic apparatus 400 has a directivity schematically to one side (−Y direction).

[Electronic Apparatus] (Second Example of Second Embodiment)

Figure 14:
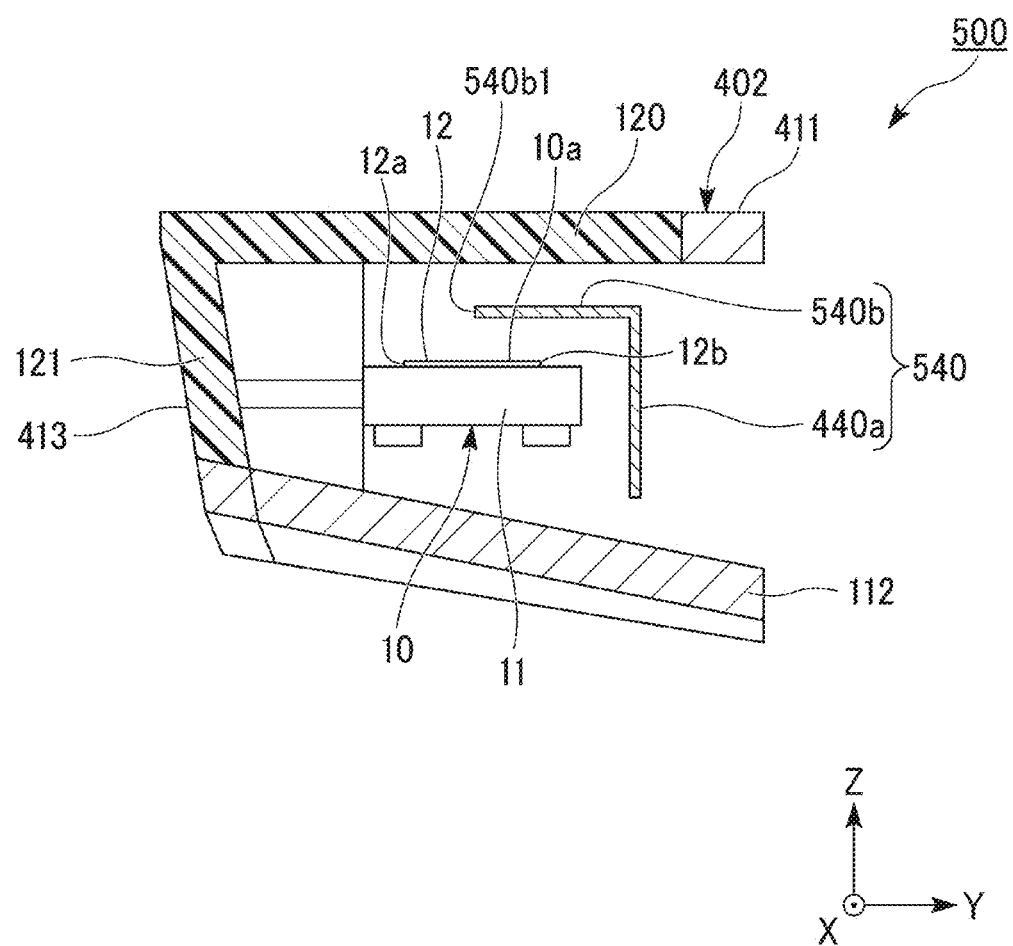
FIG. 14 is a sectional view illustrating the internal structure of a second example of an electronic apparatus according to the second embodiment.

FIG. 14 is a sectional view illustrating the internal structure of an electronic apparatus 500 according to a second example of the second embodiment.

In the electronic apparatus 500, a reflection member 540 has the main part 440a and a shielding part 540b. The shielding part 540b has an extension length from the main part 440a, which is shorter than that of the shielding part 440b in the first example (see FIG. 12). The shielding part 540b overlaps part of the radio wave transmission/reception part 12 of the antenna 10 in plan view. A tip 540b1 of the shielding part 540b is located in a position more rightward than the outer edge 12a of the radio wave transmission/reception part 12 and more leftward than an inner edge 12b thereof.

Figure 15:
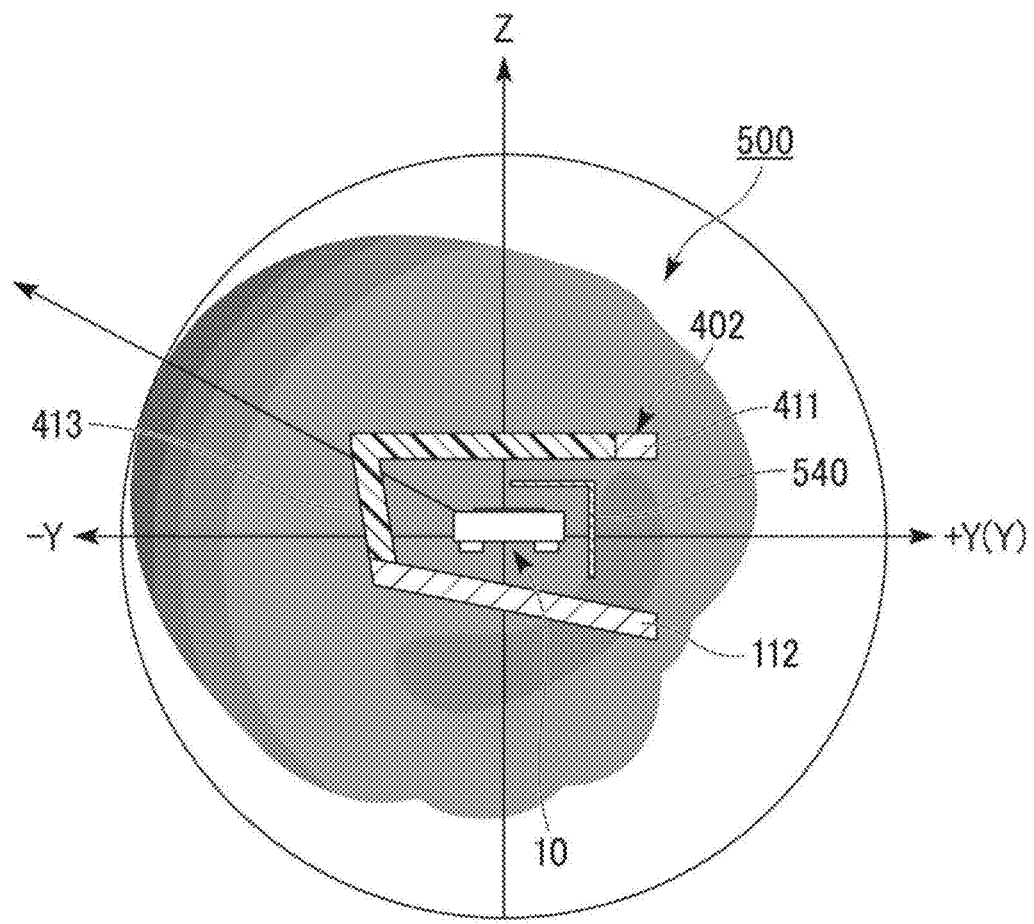
FIG. 15 is a diagram illustrating an example of a radiation pattern of radio waves of the antenna in the second example of the electronic apparatus according to the second embodiment.

FIG. 15 is a diagram illustrating an example of a radiation pattern of radio waves of the antenna 10 in the electronic apparatus 500. As illustrated in FIG. 15, the antenna 10 of the electronic apparatus 500 has a diagonally upward directivity.

[Electronic Apparatus] (Third Example of Second Embodiment)

Figure 16:
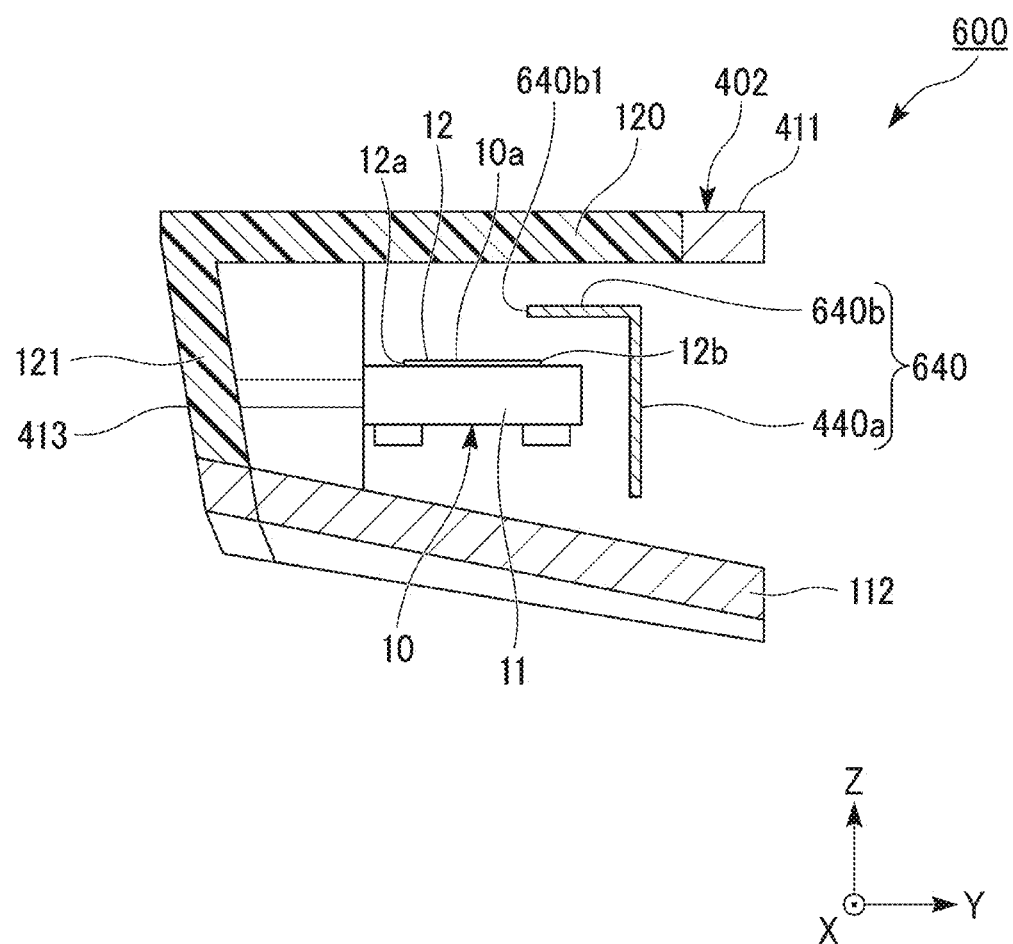
FIG. 16 is a sectional view illustrating the internal structure of a third example of an electronic apparatus according to the second embodiment.

FIG. 16 is a sectional view illustrating the internal structure of an electronic apparatus 600 according to a third example of the second embodiment.

In the electronic apparatus 600, a reflection member 640 has the main part 440a and a shielding part 640b.

The shielding part 640b has an extension length from the main part 440a, which is shorter than that of the shielding part 540b in the second example (see FIG. 14). The shielding part 640b overlaps part of the radio wave transmission/reception part 12 of the antenna 10 in plan view. A tip 640b1 of the shielding part 640b is located in a position more rightward than the outer edge 12a of the radio wave transmission/reception part 12 and more leftward than the inner edge 12b thereof.

Figure 17:
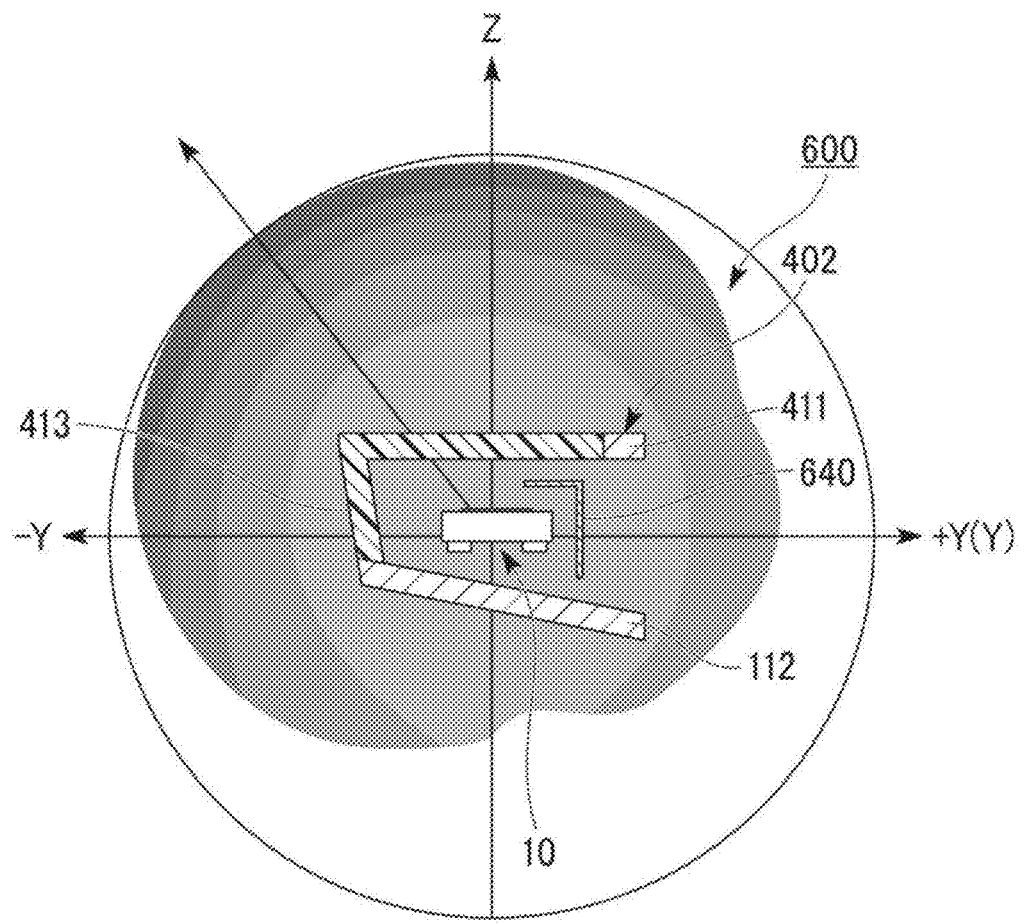
FIG. 17 is a diagram illustrating an example of a radiation pattern of radio waves of the antenna in the third example of the electronic apparatus according to the second embodiment.

FIG. 17 is a diagram illustrating an example of a radiation pattern of radio waves of the antenna 10 in the electronic apparatus 600. As illustrated in FIG. 17, the antenna 10 has a diagonally upward directivity in the electronic apparatus 600. The direction of the directivity in the electronic apparatus 600 is larger in inclination angle with respect to the Y direction than the direction of the directivity in the electronic apparatus 500 illustrated in FIG. 15.

[Electronic Apparatus] (Fourth Example of Second Embodiment)

Figure 18:
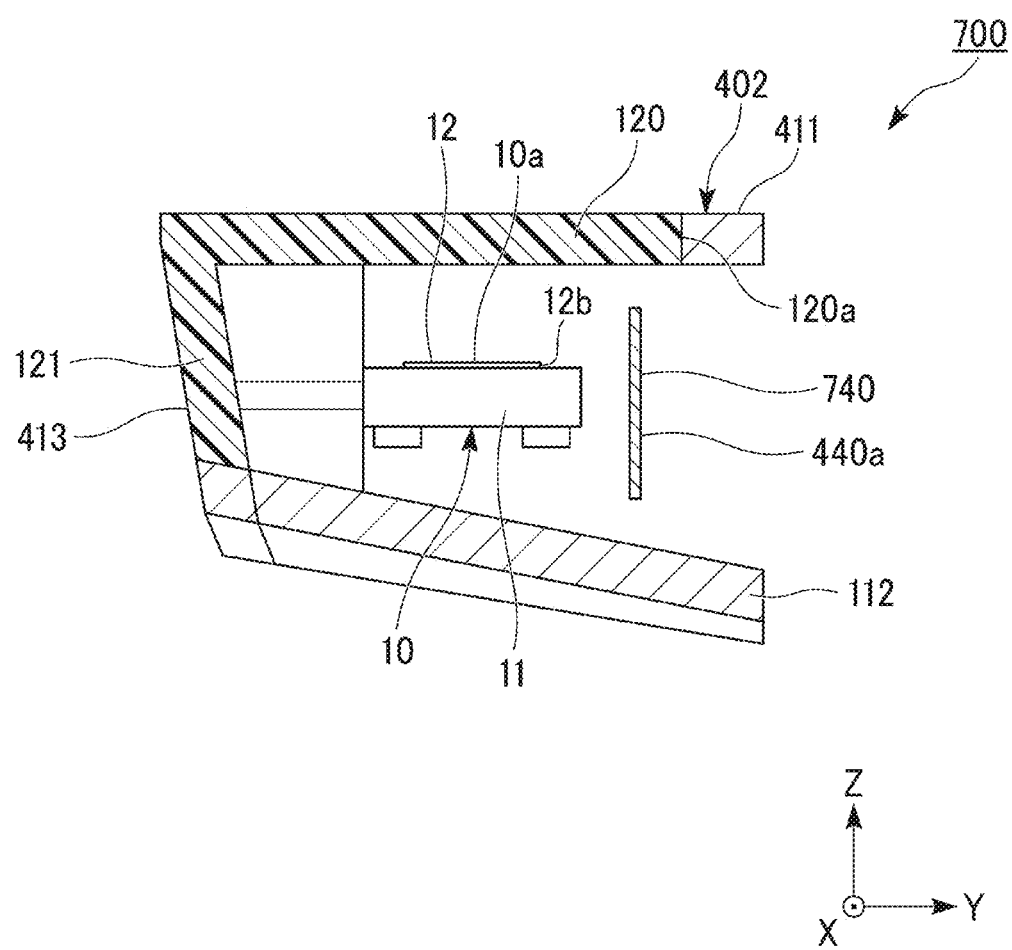
FIG. 18 is a sectional view illustrating the internal structure of a fourth example of an electronic apparatus according to the second embodiment.

FIG. 18 is a sectional view illustrating the internal structure of an electronic apparatus 700 according to a fourth example of the second embodiment.

In the electronic apparatus 700, a reflection member 740 is composed only of the main part 440a. Since there is no shielding part, the reflection member 740 does not overlap any part of the radio wave transmission/reception part 12 of the antenna 10 in plan view.

Figure 19:
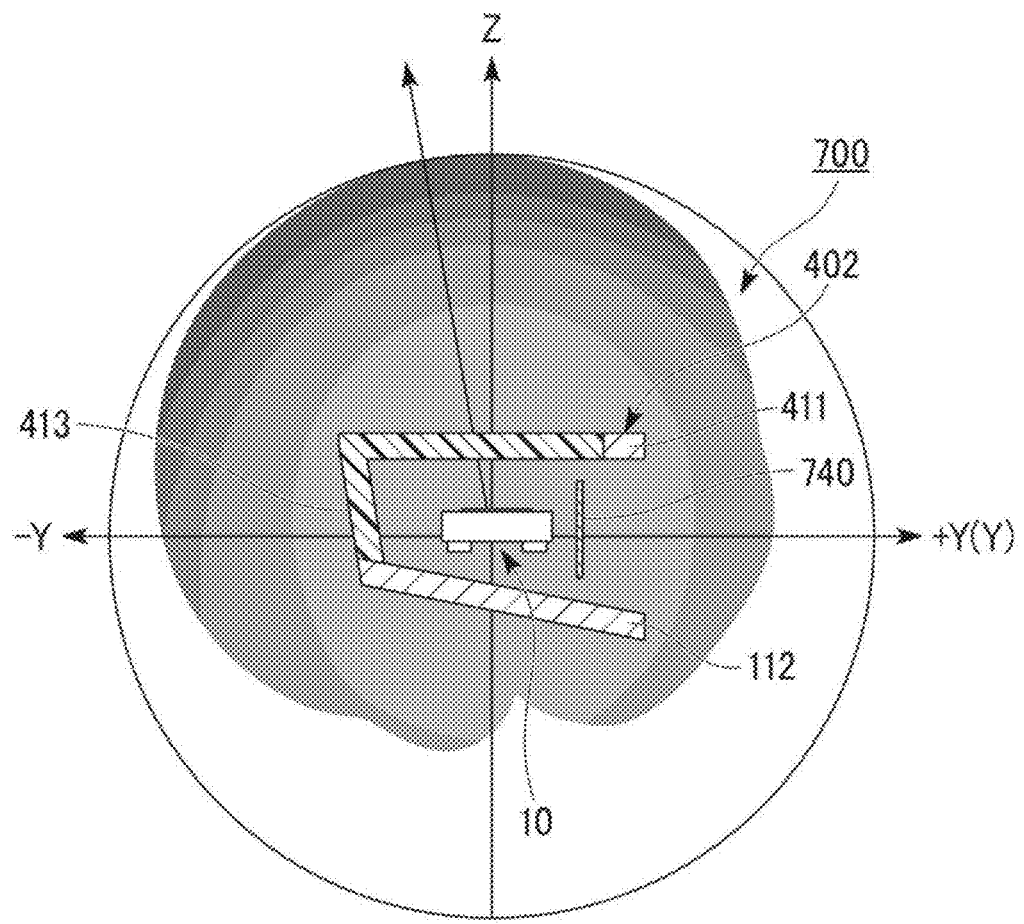
FIG. 19 is a diagram illustrating an example of a radiation pattern of radio waves of the antenna in the fourth example of the electronic apparatus according to the second embodiment.

FIG. 19 is a diagram illustrating an example of a radiation pattern of radio waves of the antenna 10 in the electronic apparatus 700. As illustrated in FIG. 19, the antenna 10 has a diagonally upward directivity in the electronic apparatus 700. The direction of the directivity in the electronic apparatus 700 is larger in inclination angle with respect to the Y direction than the direction of the directivity in the electronic apparatus 600 illustrated in FIG. 17.

As illustrated in FIG. 13, FIG. 15, FIG. 17, and FIG. 19, the directivity of the antenna 10 varies according to the length of the shielding part. Therefore, the directivity of the antenna 10 can be adjusted easily according to the purpose of use.

In the electronic apparatuses 400, 500, 600, and 700 illustrated in FIG. 12, FIG. 14, FIG. 16, and FIG. 18, the transmission/reception characteristics (for example, the directivity) of the antennas 10, 20 can be increased. In the electronic apparatuses 400, 500, 600, and 700, the degree of freedom in design can also be enhanced.

Although the radio wave transmission part 120 illustrated in FIG. 12, FIG. 14, FIG. 16, and FIG. 18 includes the whole of the radio wave transmission/reception part 12 of the antenna 10 in plan view, the radio wave transmission part may be constructed to overlap only part of the radio wave transmission/reception part of the antenna in plan view.

For example, when an inner edge 120a of the radio wave transmission part 120 illustrated in FIG. 18 is located in a position more outward (more in the −Y direction) than the inner edge 12b of the radio wave transmission/reception part 12 of the antenna 10, the upper plate 411 overlaps part of the radio wave transmission/reception part 12 in plan view. Depending on the position of the inner edge 120a of the radio wave transmission part 120 in the Y direction, the area of the radio wave transmission/reception part 12 to be covered with the upper plate 411 is increased or decreased.

FIG. 20, FIG. 22, FIG. 24, and FIG. 26 are sectional views illustrating internal structures of electronic apparatuses according to fifth to eighth examples of the second embodiment, respectively. FIG. 21, FIG. 23, FIG. 25, and FIG. 27 are diagrams illustrating examples of radiation patterns of radio waves of the antenna 10 in the fifth to eighth examples of the second embodiment, respectively.

Figure 20:
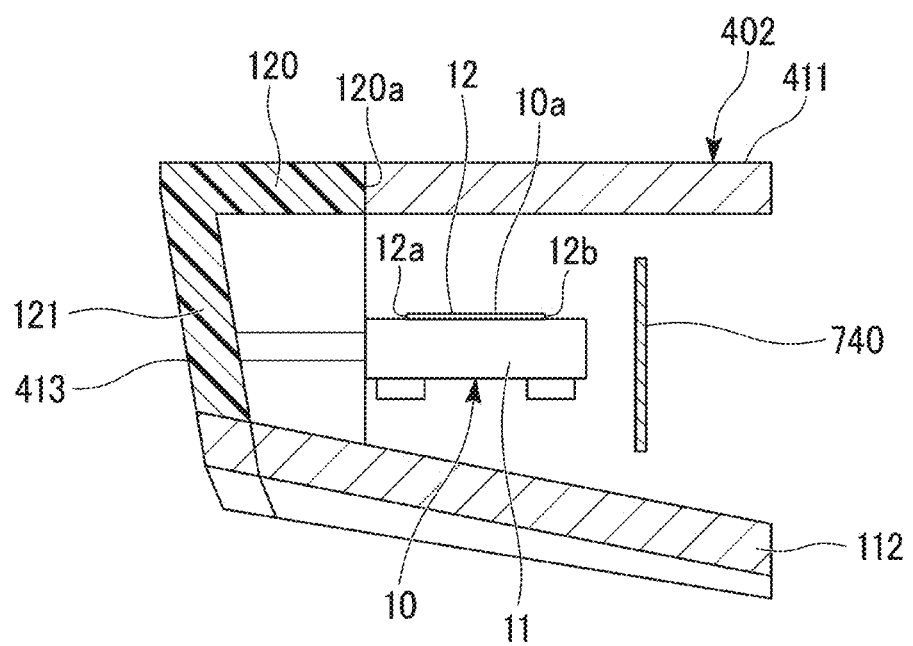
FIG. 20 is a sectional view illustrating the internal structure of a fifth example of an electronic apparatus according to the second embodiment.
Figure 21:
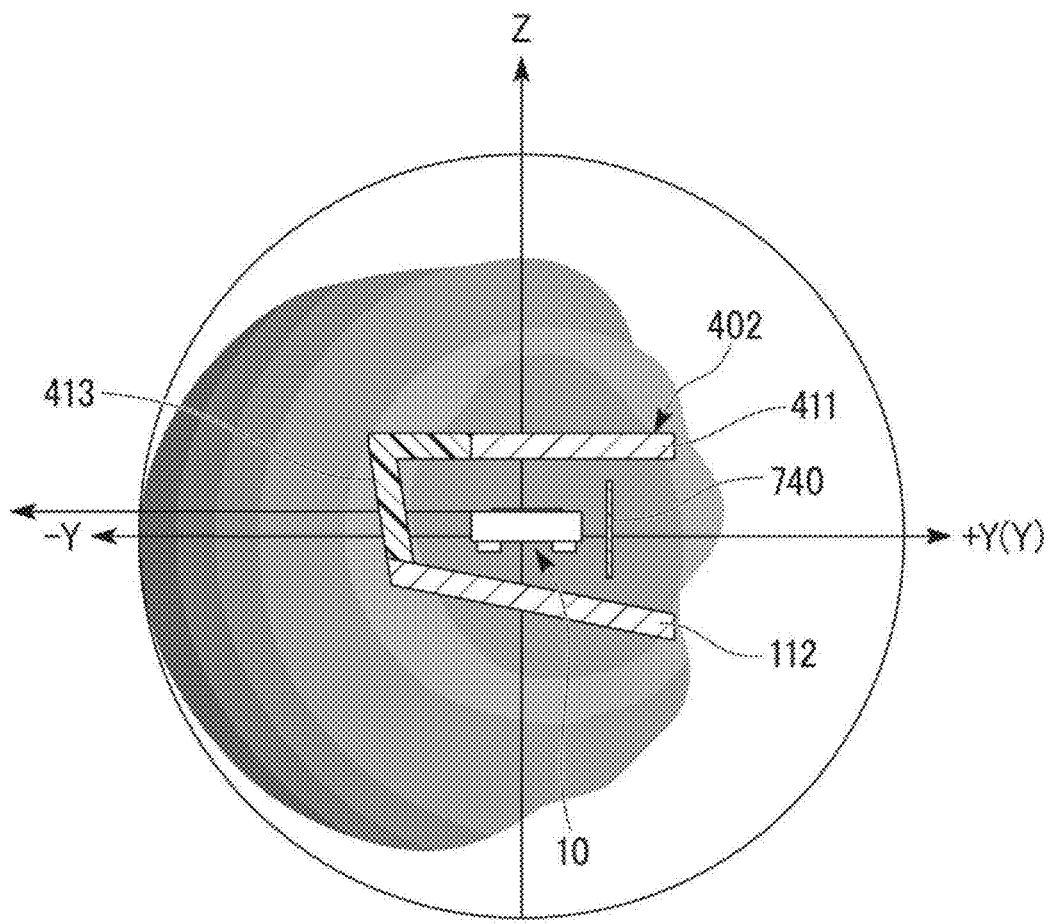
FIG. 21 is a diagram illustrating an example of a radiation pattern of radio waves of the antenna in the fifth example of the electronic apparatus according to the second embodiment.

In FIG. 20, since the inner edge 120a of the radio wave transmission part 120 is located in a position more outward (more in the −Y direction) than the outer edge 12a of the radio wave transmission/reception part 1, the upper plate 411 overlaps the whole of the radio wave transmission/reception part 12 in plan view. In this case, as illustrated in FIG. 21, the antenna 10 exhibits a directivity schematically to one side (−Y direction).

Figure 22:
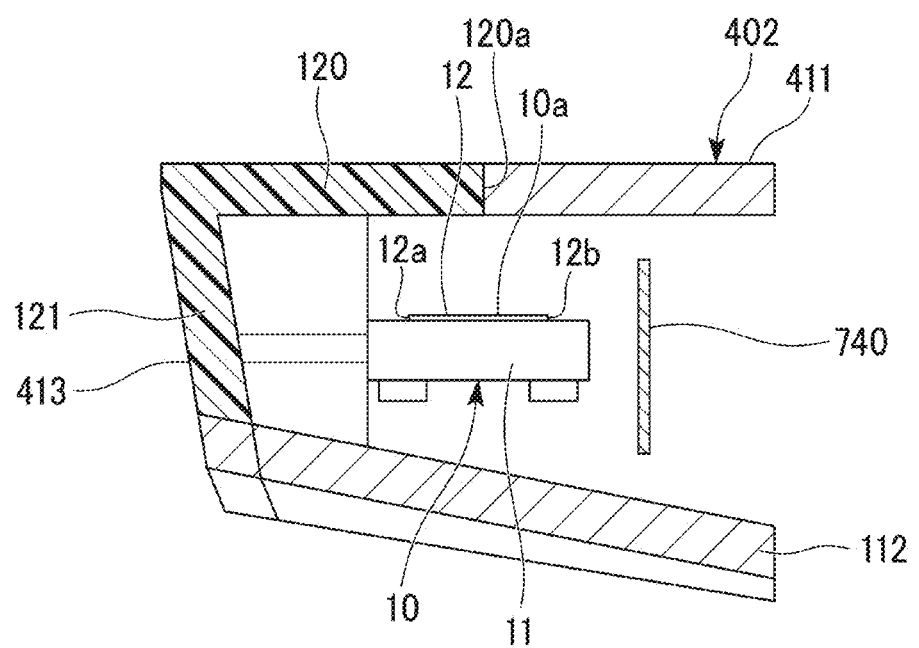
FIG. 22 is a sectional view illustrating the internal structure of a sixth example of an electronic apparatus according to the second embodiment.
Figure 23:
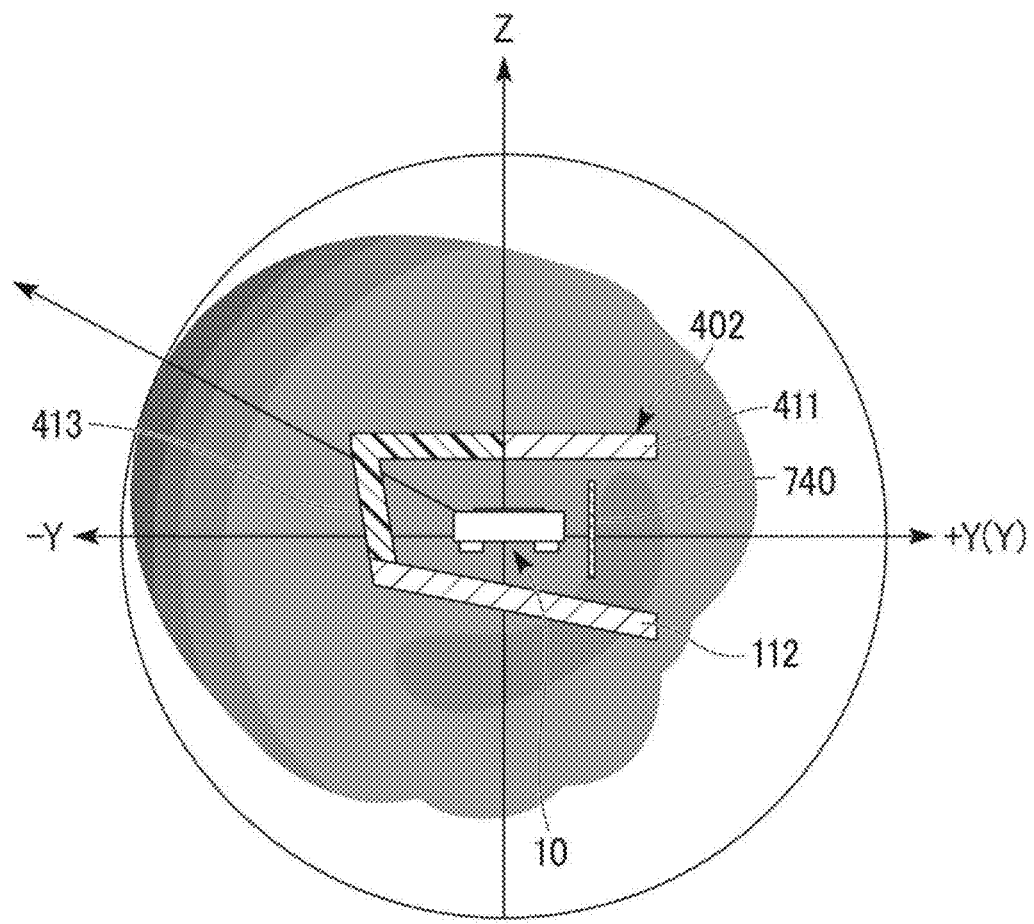
FIG. 23 is a diagram illustrating an example of a radiation pattern of radio waves of the antenna in the sixth example of the electronic apparatus according to the second embodiment.

In FIG. 22, the inner edge 120a of the radio wave transmission part 120 is located more outward (more in the −Y direction) than the inner edge 12b of the radio wave transmission/reception part 12 and more inward (more in the +Y direction) than the outer edge 12a of the radio wave transmission/reception part 12. The upper plate 411 overlaps about half area of the radio wave transmission/reception part 12 in plan view. In this case, as illustrated in FIG. 23, the antenna 10 has a diagonally upward directivity.

Figure 24:
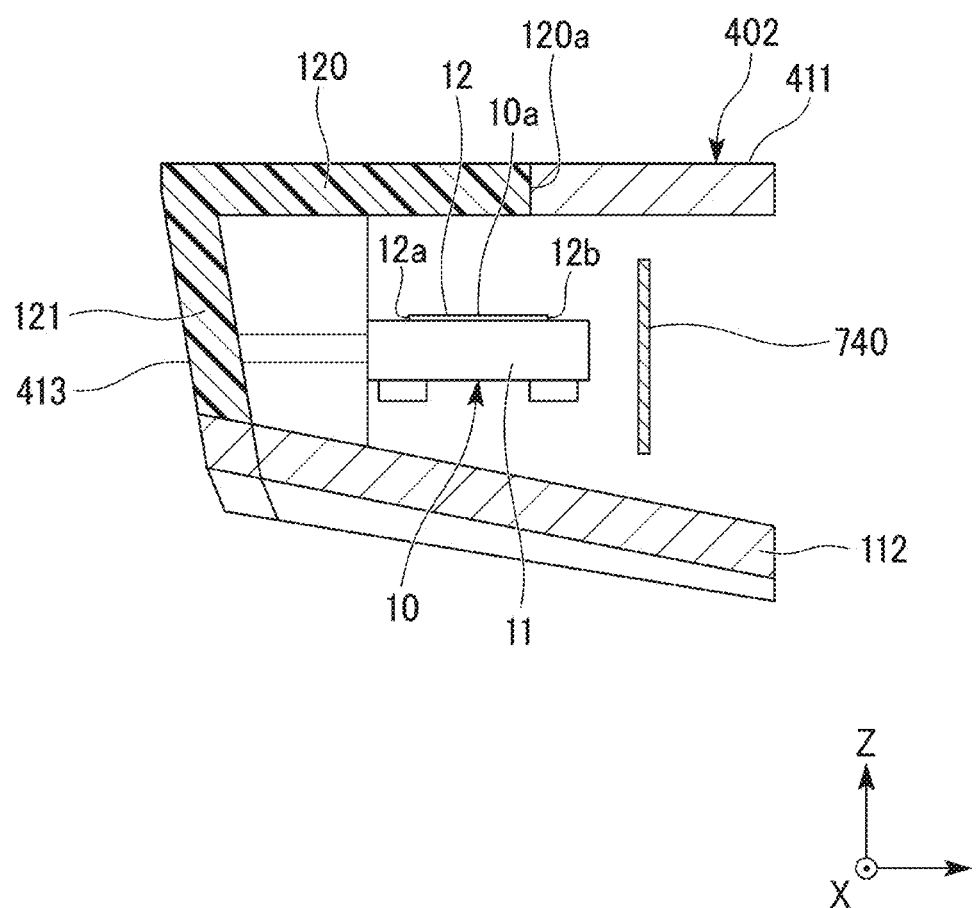
FIG. 24 is a sectional view illustrating the internal structure of a seventh example of an electronic apparatus according to the second embodiment.
Figure 25:
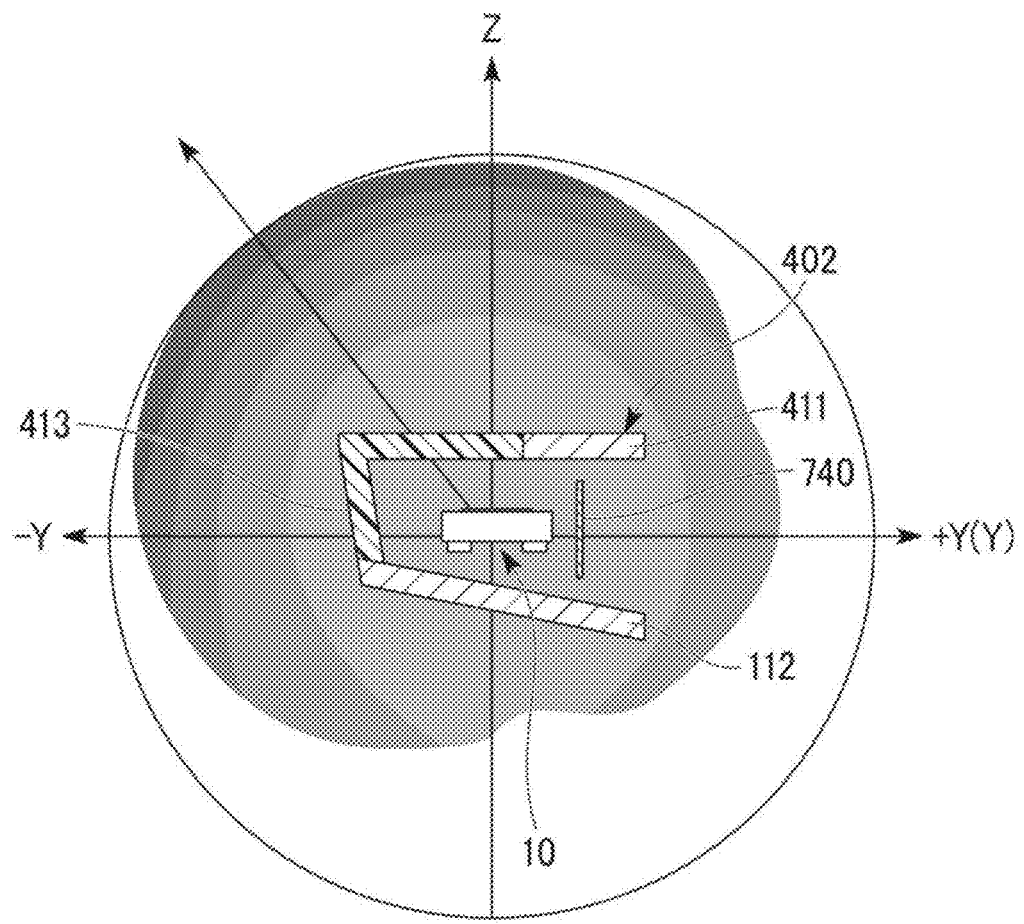
FIG. 25 is a diagram illustrating an example of a radiation pattern of radio waves of the antenna in the seventh example of the electronic apparatus according to the second embodiment.

In FIG. 24, since the position of the inner edge 120a of the radio wave transmission part 120 in the Y direction is closer to the position of the inner edge 12b of the radio wave transmission/reception part 12 in the Y direction, the overlapped area of the radio wave transmission/reception part 12 with the upper plate 411 in plan view is very little. In this case, as illustrated in FIG. 25, a directivity with a large inclination angle with respect to the Y direction can be obtained.

Figure 26:
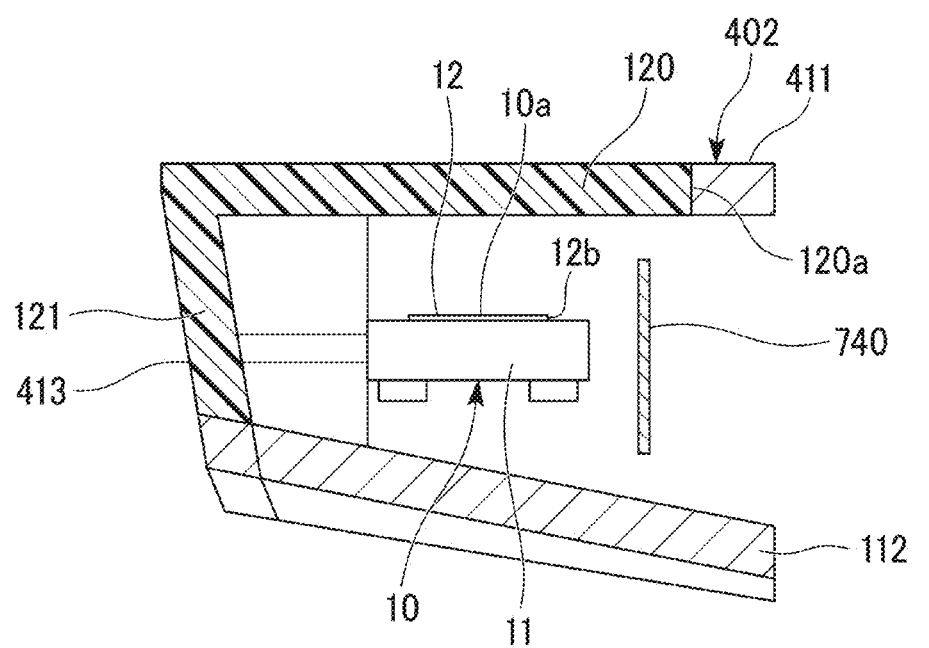
FIG. 26 is a sectional view illustrating the internal structure of an eighth example of an electronic apparatus according to the second embodiment.
Figure 27:
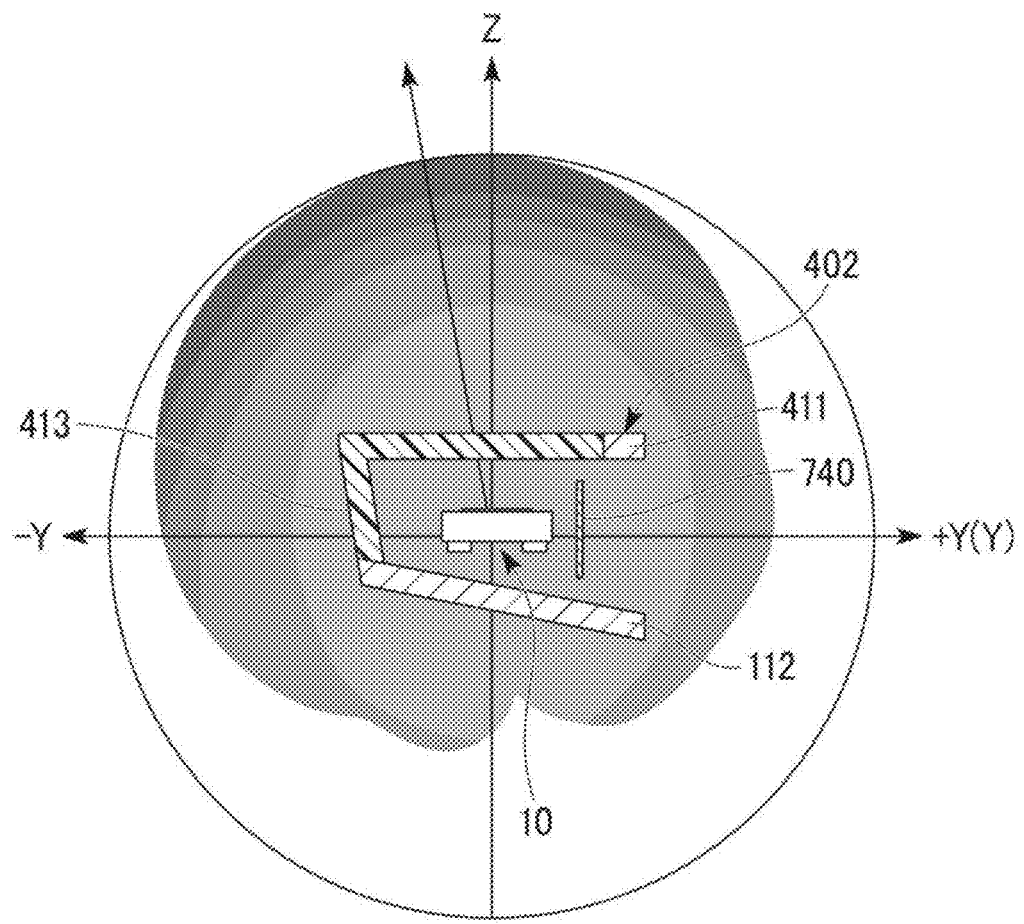
FIG. 27 is a diagram illustrating an example of a radiation pattern of radio waves of the antenna in the eighth example of the electronic apparatus according to the second embodiment.

In FIG. 26, since the position of the inner edge 120a of the radio wave transmission part 120 in the Y direction is more inward (more in the +Y direction) than the position of the inner edge 12b of the radio wave transmission/reception part 12 in the Y direction, the upper plate 411 does not overlap the radio wave transmission/reception part 12 in plan view. In this case, as illustrated in FIG. 27, a directivity with a larger inclination angle with respect to the Y direction can be obtained.

The directivity of the antenna 10 varies according to the relative position of the radio wave transmission/reception part 12 and the upper plate 411. Therefore, the directivity of the antenna 10 can be adjusted easily.

Figure 28:
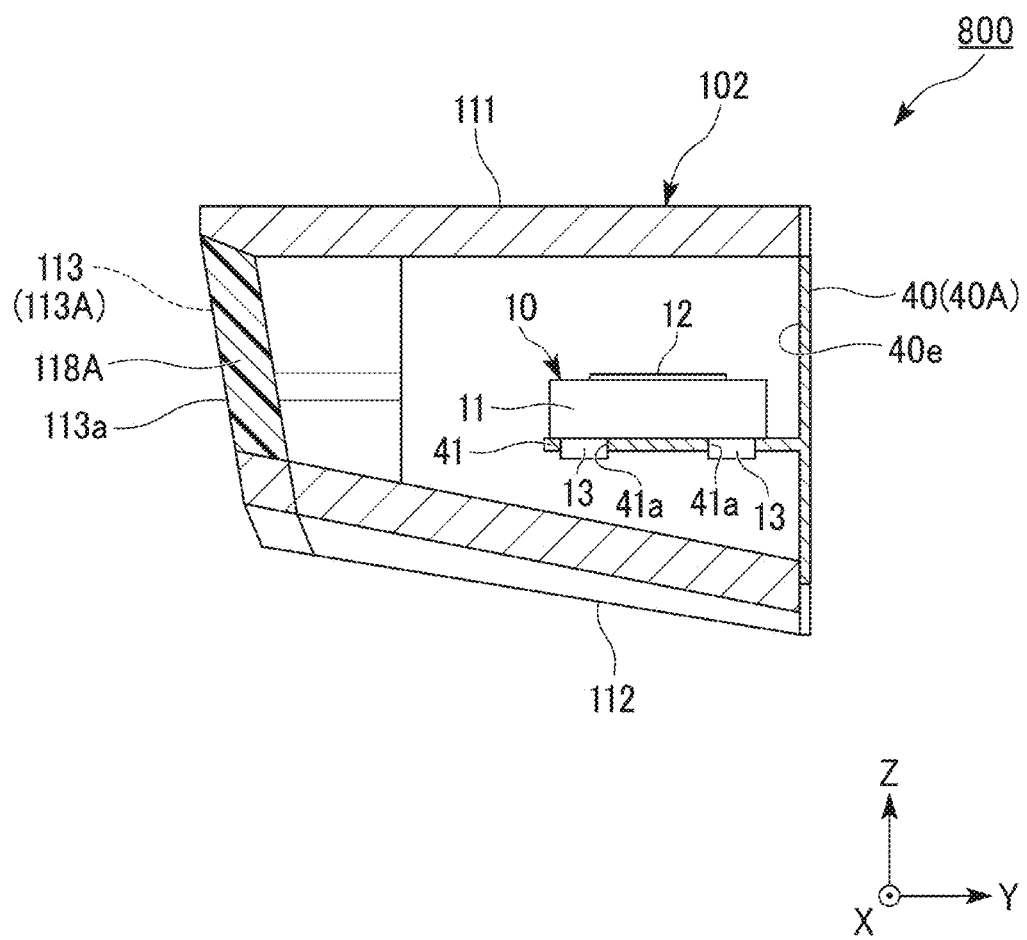
FIG. 28 is a sectional view illustrating the internal structure of a variation of the electronic apparatus according to the first embodiment.

FIG. 28 is a sectional view illustrating the internal structure of a variation of the electronic apparatus 100 according to the first embodiment. Components common to the electronic apparatus of the other embodiment are given the same reference numerals to omit the description thereof.

As illustrated in FIG. 28, an electronic apparatus 800 is different from the electronic apparatus 100 illustrated in FIG. 4 in that a support plate 41 (support part) is formed on the outer surface (reflection surface 40e) of the reflection member 40 to support the antenna 10. The support plate 41 is parallel to the upper plate 111, and extends outwardly from the outer surface (reflection surface 40e) of the reflection member 40. The support plate 41 is made, for example, of a metal. The support plate 41 can support the antenna 10 in a predetermined height position between the upper plate 111 and the lower plate 112.

Since the support plate 41 has holes 41a through which legs 13 provided on the lower surface of the body part 11 of the antenna 10 are inserted, the support plate 41 is in contact with the lower surface of the body part 11 of the antenna 10. Therefore, the contact area between the support plate 41 and the body part 11 is large, and hence the heat of the body part 11 is efficiently transferred to the support plate 41.

The electronic apparatus 800 can transfer the heat of the reflection member 40 to the upper plate 111 and the lower plate 112 through the support plate 41. This can suppress the temperature rise of the reflection member 40. Since the electronic apparatus 800 has the support plate 41, the structure of supporting the antenna 10 can be simplified.

Figure 29:
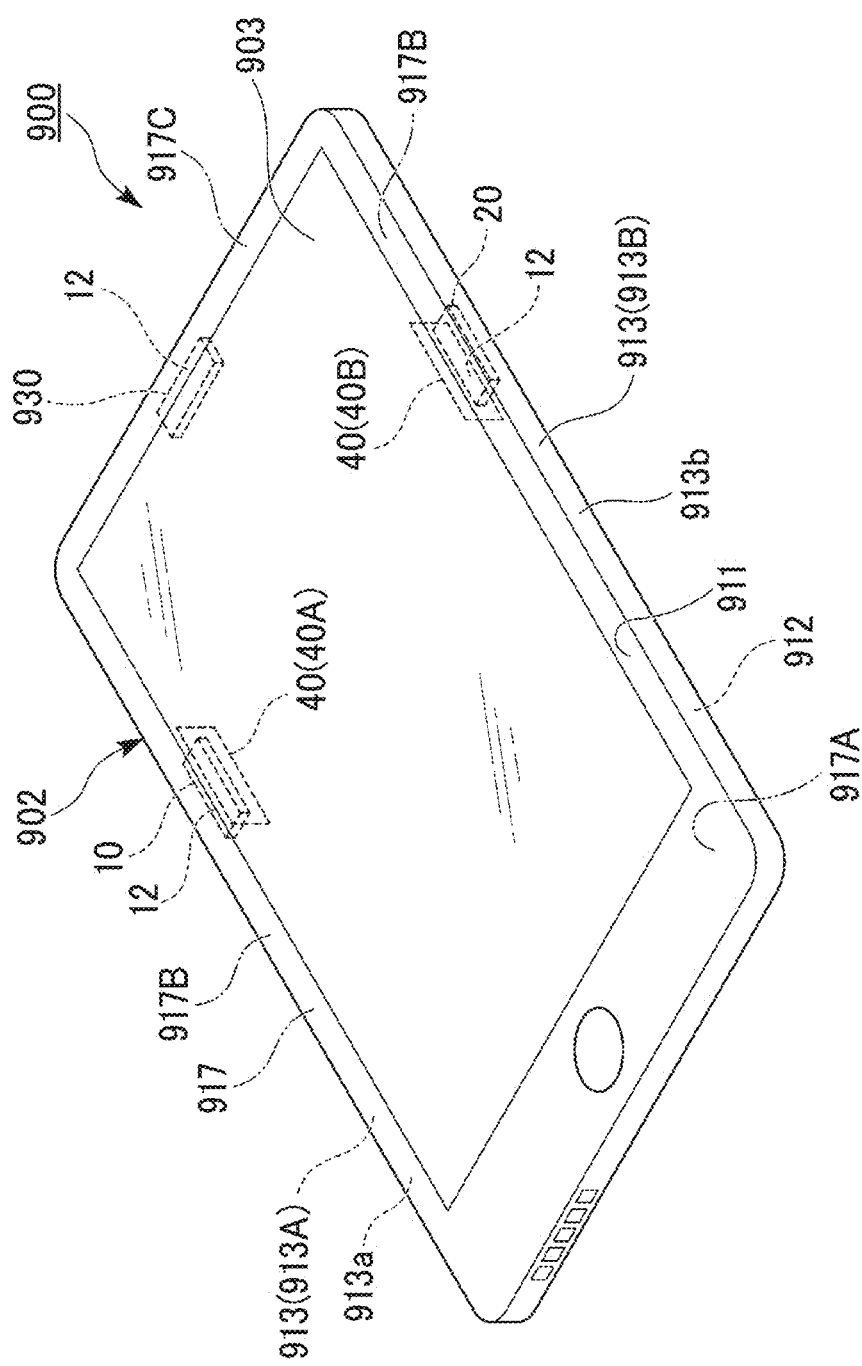
FIG. 29 is a perspective view of an electronic apparatus according to a third embodiment.

FIG. 29 is a perspective view of an electronic apparatus 900 according to a third embodiment.

As illustrated in FIG. 29, the electronic apparatus 900 includes a chassis 902, first to third antennas 10, 20, 930, and reflection members 40, 40. The chassis 902 has a flat plate-like case body. A display 903 is mounted on the chassis 902. The electronic apparatus 900 is, for example, a smartphone, a tablet terminal, or the like.

The chassis 902 has an upper plate 911, a lower plate 912, and a pair of side plates 913, 913 (913A, 913B).

An outer peripheral edge area 917 is an area including an outer peripheral edge of the upper plate 911 of the chassis 902, which is a rectangular frame-like area surrounding the display 903 in plan view. The outer peripheral edge area 917 has a front area 917A including the front edge of the upper plate 911, side areas 917B, 917B including side edges, and a rear area 917C including the rear edge.

The antenna 10 is formed in one side area 917B in plan view. The antenna 20 is formed in the other side area 917B in plan view. The antenna 930 is formed in the rear area 917C in plan view. The antennas 10, 20, 930 are so placed in the chassis 902 that the respective radio wave transmission/reception parts 12 face the upper plate 911 of the chassis 902. Note that the antenna 930 may be formed in the front area 917A.

A first reflection member 40A of the reflection members 40, 40 is so placed that the antenna 10 is sandwiched between the first reflection member 40A and a side face 913a of one side plate 913 (913A) of the chassis 902. A second reflection member 40B is so placed that the antenna 20 is sandwiched between the second reflection member 40B and a side plate 913 (913B) of the other side face 913b of the chassis 902.

Since the reflection members 40, 40 are included in the electronic apparatus 900, the transmission/reception characteristics (for example, the directivity) of the antennas 10, 20 can be increased. In the electronic apparatus 900, the degree of freedom in design can also be increased.

The specific structures of this invention are not limited to those in the above-described embodiments, and any design change can be made without departing from the gist of this invention. The respective structures described in the aforementioned embodiments can be combined arbitrarily.

For example, as illustrated in FIG. 4, the reflection member 40 is in contact with both the upper plate 111 and the lower plate 112 in the electronic apparatus 100, but the reflection member may be in contact with only either one of the upper plate and the lower plate. Further, the reflection member may be held in the chassis by an unillustrated support structure.

As illustrated in FIG. 2, the third antenna 30 is provided in the electronic apparatus 100 at a position included in the front area 117A of the outer peripheral edge area 117 in plan view, but the third antenna may be provided at a position included in the rear area of the outer peripheral edge area in plan view.

Further, the electronic apparatus 100 includes the first to third antennas 10, 20, 30, but the third antenna may not be required.

The electronic apparatus 100 includes the antennas 10, 20 arranged respectively between the reflection members 40 and the side faces of the second chassis 102, but the number of antennas arranged between the reflection members and the side faces of the chassis is not limited to two. The number of antennas may be one, or any number of more than two.

Further, the radio waves in the millimeter wave band may be in a frequency band from 24 GHz to 300 GHz.

The invention claimed is:

1. An electronic apparatus comprising:
   a chassis having an upper plate, a lower plate, and a side face;
   wherein the upper plate is disposed in a first plane, the lower plate is disposed in a second plane, and the side face is disposed in a third plane;
   wherein the first plane is non-parallel to the second plane, and the third plane is non-perpendicular to the first plane and to the second plane;
   at least one plate-like antenna inside the chassis and having a radio wave transmission/reception part for transmission/reception in a millimeter wave band, wherein the radio wave transmission/reception part forms one surface of the antenna; and
   a conductive reflection member inside the chassis and having a main part with a reflection surface that reflects radio waves in the millimeter wave band, wherein
   the antenna is in an outer peripheral edge area of the chassis and at an outer peripheral edge of the upper plate whereby the radio wave transmission/reception part faces the upper plate,
   the antenna is disposed in a fourth plane,
   the fourth plane is parallel to the first plane, and is non-perpendicular to the second plane and to the third plane,
   the reflection member is disposed so that the antenna is sandwiched between the reflection member and the side face,
   at least the side face transmits the radio waves, and
   the reflection surface is directed toward the antenna.

2. The electronic apparatus according to claim 1, wherein the reflection member is in contact with at least one of the upper plate and the lower plate in a heat transferable manner.

3. The electronic apparatus according to claim 1, wherein the reflection member has a support part which supports the antenna.

4. The electronic apparatus according to claim 1, wherein at least a partial area of the upper plate is a radio wave transmission part which allows the radio waves to be transmitted therethrough, and
the radio wave transmission part overlaps the radio wave transmission/reception part.

5. The electronic apparatus according to claim 4, wherein the reflection member further has a shielding part extending from the main part to a position between the antenna and the radio wave transmission part, and
the shielding part overlaps the radio wave transmission/reception part.

6. The electronic apparatus according to claim 1, wherein the reflection member is made of a metal.

7. The electronic apparatus according to claim 1, further comprising:
   a keyboard on the chassis;

a display chassis coupled openably and closably to the chassis through a hinge; and a display mounted on the display chassis.

\* \* \* \* \*